United States Patent
Taylor et al.

(10) Patent No.: US 11,578,204 B2
(45) Date of Patent: Feb. 14, 2023

(54) POLYMERS FOR ADDITIVE MANUFACTURING

(71) Applicant: Poly-Med, Inc., Anderson, SC (US)

(72) Inventors: Michael Scott Taylor, Anderson, SC (US); James Hyde, Anderson, SC (US); Brian Gaerke, Travelers Rest, SC (US); Brad Johns, Clemson, SC (US); Michael Aaron Vaughn, Anderson, SC (US); Seth Dylan McCullen, Anderson, SC (US); David Gravett, Mountain View, CA (US)

(73) Assignee: POLY-MED, INC., Anderson, SC (US)

( * ) Notice: Subject to any disclaimer, the term of this patent is extended or adjusted under 35 U.S.C. 154(b) by 218 days.

(21) Appl. No.: 16/643,422

(22) PCT Filed: Aug. 31, 2018

(86) PCT No.: PCT/US2018/049250
§ 371 (c)(1),
(2) Date: Feb. 28, 2020

(87) PCT Pub. No.: WO2019/046808
PCT Pub. Date: Mar. 7, 2019

(65) Prior Publication Data
US 2021/0070987 A1 Mar. 11, 2021

Related U.S. Application Data

(60) Provisional application No. 62/553,377, filed on Sep. 1, 2017.

(51) Int. Cl.
*C08L 71/02* (2006.01)
*B33Y 10/00* (2015.01)
(Continued)

(52) U.S. Cl.
CPC .............. *C08L 71/02* (2013.01); *B29B 11/10* (2013.01); *B29B 13/00* (2013.01); *B29C 64/118* (2017.08);
(Continued)

(58) Field of Classification Search
CPC ..... B29C 64/118; B29C 64/314; B29B 13/00; B29B 11/10; D01D 5/247; D01F 6/44; D01F 6/88
See application file for complete search history.

(56) References Cited

U.S. PATENT DOCUMENTS

| 5,898,040 A | 4/1999 | Shalaby |
| 6,626,939 B1 * | 9/2003 | Burnside .................. D04C 1/06 623/1.53 |

(Continued)

FOREIGN PATENT DOCUMENTS

| CN | 1449850 A | 10/2003 |
| DE | 102013011243 | 1/2015 |

(Continued)

OTHER PUBLICATIONS

International Search Report and Written Opinion dated Jan. 7, 2019, for International Application No. PCT/US2018/049250.
(Continued)

*Primary Examiner* — Nahida Sultana

(57) ABSTRACT

Porous and microporous parts prepared by additive manufacturing as disclosed herein are useful in medical and non-medical applications. The parts are prepared from a composition containing both a solvent soluble component and a solvent insoluble component. After a part is printed by an additive manufacturing process it is exposed to solvent to extract solvent soluble component away from the printed part, resulting in a part having surface cavities.

78 Claims, 7 Drawing Sheets

(51) Int. Cl.
*B33Y 70/00* (2020.01)
*B29C 64/314* (2017.01)
*B29C 64/118* (2017.01)
*B33Y 40/20* (2020.01)
*B33Y 40/10* (2020.01)
*B29B 11/10* (2006.01)
*B29B 13/00* (2006.01)
*B29C 71/00* (2006.01)
*C08L 67/04* (2006.01)
*B33Y 70/10* (2020.01)
*B29K 101/12* (2006.01)

(52) U.S. Cl.
CPC ........ *B29C 64/314* (2017.08); *B29C 71/0009* (2013.01); *B33Y 10/00* (2014.12); *B33Y 40/10* (2020.01); *B33Y 40/20* (2020.01); *B33Y 70/00* (2014.12); *B33Y 70/10* (2020.01); *C08L 67/04* (2013.01); *B29C 2071/0027* (2013.01); *B29K 2101/12* (2013.01)

(56) References Cited

U.S. PATENT DOCUMENTS

| | | |
|---|---|---|
| 2003/0015826 A1 | 1/2003 | Topolkaraev et al. |
| 2009/0118241 A1* | 5/2009 | Andjelic ................ C08L 67/04 514/159 |
| 2012/0053689 A1* | 3/2012 | Martin .................. A61B 17/04 606/228 |
| 2013/0302610 A1 | 11/2013 | Park et al. |
| 2014/0267997 A1* | 9/2014 | Hasegawa ......... G02F 1/133707 349/143 |
| 2015/0119935 A1 | 4/2015 | Andjelic et al. |
| 2016/0177026 A1 | 6/2016 | Gray, Jr. et al. |

FOREIGN PATENT DOCUMENTS

| | | |
|---|---|---|
| JP | 2005-523391 A | 8/2005 |
| JP | 2016-204550 A | 12/2016 |
| JP | 2017-132076 A | 8/2017 |
| JP | 6359230 B1 | 7/2018 |
| WO | 2013128401 A1 | 6/2013 |
| WO | 2016125860 A1 | 8/2016 |
| WO | 2016140906 A1 | 9/2016 |
| WO | 2017019393 A1 | 2/2017 |
| WO | 2017062031 A1 | 4/2017 |
| WO | 2018031491 A1 | 2/2018 |

OTHER PUBLICATIONS

European Supplementary Search, dated Apr. 22, 2021 for EP Application No. 18852350.0, national phase application of PCT No. PCT/US2018/049250, 4 pages.

English tramslation, from Google, of DE10201311243, provided as above in original German publication, 7 pages.

Abstract, Zahedi Mostafa et al: "Influence of molecular weight distributi on on flow properties of commercial pol yolefins", Journal of Appli ed Polym er Science,vol. 108, No. 6,Jan. 1, 2008 (Jan. 1, 2008), pp. 3565-3571, XP055793927,US.

* cited by examiner

| | Time (days) of incubation at 12pH, 50°C | | | | |
|---|---|---|---|---|---|
| | 0 | 0.25 | 1 | 3 | 6 |
| A |  |  |  |  |  |
| B |  |  |  |  |  |
| C |  |  |  |  |  |
| D |  |  |  |  |  |
| E |  |  |  |  |  |

POLYMERS FOR ADDITIVE MANUFACTURING

CROSS-REFERENCE TO RELATED APPLICATION

This application is a national phase application under 35 U.S.C. § 371 of International Application No. PCT/US2018/049250, filed Aug. 31, 2018, which claims the benefit under 35 U.S.C. § 119(e) of U.S. Provisional Patent Application No. 62/553,377 filed Sep. 1, 2017; which applications are incorporated herein by reference in their entireties for all purposes.

FIELD OF THE INVENTION

The present invention relates generally to additive printing, polymeric compositions for use therein and products made thereby, including bioabsorbable polymers for medical uses.

BACKGROUND

Additive manufacturing, also known as 3D printing, has developed from curiosity to industrial process over the past twenty years, mostly through advancements in equipment and computer software. While the ability to create advanced structures has improved, there exists a need for improved, multifunctional materials to support this growing technology.

One popular method of additive manufacturing is fused filament fabrication (FFF). The majority of additive manufacturing through FFF utilizes a single-phase thermoplastic polymeric monofilament to generate a print line through melt extrusion. In advanced scenarios, multiple monofilaments are used to create zones of specific design. Most commonly, a second monofilament is used to generate a support, where the second monofilament material is water soluble for easy removal after the printing is complete. This is quite useful, but the phase organization of this approach is limited to the tolerances of the printing equipment.

There thus remains a need in the art for improved materials that may be used in additive manufacturing, particularly in the manufacturing of biomedical products. The present invention is directed to addressing this need.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

SUMMARY

In brief, the present disclosure provides compositions useful in additive manufacturing, methods of conducting additive manufacturing that make use of the compositions of the present disclosure, and products made by the additive manufacturing process, and related subjects.

For example, in one embodiment, the present disclosure provides a composition comprising an additive in a polymer phase, wherein: a) the additive is soluble in a solvent; b) the polymer phase comprises an organic polymer and is essentially insoluble in the solvent; c) the composition is a solid at temperatures below 25° C. and a viscous fluid with a Melt Flow Index of 2.5-30 g/10 min at a temperature above a melt temperature of the composition; and d) the composition has a weight percent of the additive based on the weight of the composition and a weight percent of the polymer phase based on the weight of the composition, where the sum of the weight percent of the additive and the weight percent of the polymer phase is greater than 90%.

In one embodiment the additive provides a distributed phase and the polymer phase is a continuous phase. In this embodiment, the present disclosure provides a composition comprising a distributed phase in a continuous phase, wherein the distributed phase is soluble in a solvent; the continuous phase comprises an organic polymer and is essentially insoluble in the solvent; the composition is a solid at temperatures below 25° C. and a viscous fluid with a Melt Flow Index of 2.5-30 g/10 min at a temperature above the melt temperature of the composition; and the composition has a weight percent of the distributed phase based on the weight of the composition and a weight percent of the continuous phase based on the weight of the composition, where the sum of the weight percent of the distributed phase and the weight percent of the continuous phase is greater than 90%.

Optionally, these compositions may be further characterized by one or more (e.g., two, or three, or four, etc.) of the following features: the solvent is water, the composition is in a form that can be used in an additive manufacturing process, e.g., in the form of a filament, or a spool of filament, where the filament optionally has a diameter of 1-5 mm, or the composition is in the form of powder comprising granules; the weight percent of the additive or distributed phase in the composition is 1-60%; the additive or distributed phase has an average particle size of 20-400 microns; the additive or distributed phase comprises an inorganic salt, e.g., an inorganic salt comprising a cation and an anion, where the cation is selected from sodium, potassium and magnesium and the anion is selected from chloride, bromide, iodide, sulfate, phosphate, carbonate, bicarbonate; the additive or distributed phase comprises a water-soluble organic compound, e.g., a sugar or an organic carboxylic acid or a salt thereof; the polymer or continuous phase comprises a bioabsorbable polymer, e.g., a bioabsorbable polymer comprising segments selected from polyester, polyanhydride, poly(hydroxybutyrate), and polyether; the polymer or continuous phase comprises a non-bioabsorbable polymer, e.g., a non-bioabsorbable polymer selected from polyethylene, nylon, thermoplastic polyurethane, polypropylene, polyetheretherketone, polyaryletherketone and polyethylene terephthalate; the composition has little or no residual monomer, e.g., has residual monomer at a concentration of <2% by weight which includes zero residual monomer; the composition has little or no residual tin, e.g., a tin concentration of <200 ppm, which includes zero tin; the composition has little or no non-tin heavy metals, e.g., a non-tin metal concentration of <50 ppm, which includes zero non-tin heavy metals.

In another embodiment, the present disclosure provides a method of additive manufacturing, the method comprising: a) melting a solid composition such as described herein, to provide a molten composition, the molten composition comprising either an additive and polymeric phase or a distributed phase and continuous phase as described herein; b) performing additive manufacturing to form an article from the molten composition; and c) contacting the article with a solvent, where the additive or distributed phase is soluble in the solvent, under conditions which at least partially dissolves the additive or distributed phase but not the polymer or continuous phase, to form a porous form of the article.

Optionally, this method may be further characterized by one or more (e.g., two, three, four, etc.) of the following features: the solvent comprises water; the solvent is water; the solvent dissolves at least 30% of the additive or distributed phase; the solvent dissolves at least 80% of the additive or distributed phase; the solid composition is melted at a temperature within the range of 50–450° C.; the additive manufacturing process is performed under an atmosphere of <10% relative humidity; the additive manufacturing method is fused filament fabrication (FFF); the porous form of the article comprises a plurality of holes of a maximum cross section of 0.5-50 mm; the composition has a density and the article has a density, and the article has a density of less than 85% of the density of the composition; the conditions comprise a temperature of greater than 20° C.; the porous article comprises pores of a maximum cross section of 20-400 microns; the method further comprises sterilizing the article, e.g., by a method selected from treatment with ethylene oxide, gamma, e-beam, dry heat and steam processes; the method further comprises removing residual solvent from the article, e.g., such that the residual solvent is less than one weight percent based on the weight of the porous form of the article.

In another embodiment, the present disclosure provides a method of additive manufacturing, the method comprising: a) providing a composition as described herein, e.g., comprising a distributed phase in a continuous phase as described herein or comprising an additive phase in a polymer phase as described herein; b) extruding the composition into a fiber; c) melting the fiber to provide a molten composition, the molten composition comprising either a distributed phase and a continuous phase or an additive and a polymer phase; d) performing additive manufacturing to form an article from the molten composition; d) contacting the article with a solvent, where the additive or distributed phase is soluble in the solvent, under conditions which at least partially dissolves the additive or distributed phase but not the continuous or polymer phase, to form a porous form of the article; and e) removing residual solvent from the porous form of the article such that the residual solvent is less than one weight percent based on the weight of the porous form of the article.

Optionally, this method may be further characterized by one or more (e.g., two, three, four, etc.) of the following features: the solvent comprises water; the solvent is water; the solvent dissolves at least 30% of the additive or distributed phase; the solvent dissolves at least 80% of the additive or distributed phase; the solid composition is melted at a temperature within the range of 50–450° C.; the additive manufacturing process is performed under an atmosphere of <10% relative humidity; the additive manufacturing method is fused filament fabrication (FFF); the porous form of the article comprises a plurality of holes of a maximum cross section of 0.5-50 mm; the composition has a density and the article has a density, and the article has a density of less than 85% of the density of the composition; the conditions comprise a temperature of greater than 20° C.; the porous article comprises pores of a maximum cross section of 20-400 microns; the method further comprises sterilizing the article, e.g., by a method selected from treatment with ethylene oxide, gamma, e-beam, dry heat and steam processes; the method further comprises removing residual solvent from the article, e.g., such that the residual solvent is less than one weight percent based on the weight of the porous form of the article.

The herein-mentioned and additional features of the present invention and the manner of obtaining them will become apparent, and the invention will be best understood by reference to the following more detailed description. All references disclosed herein are hereby incorporated by reference in their entirety as if each was incorporated individually.

This Brief Summary has been provided to introduce certain concepts in a simplified form that are further described in detail below in the Detailed Description. Except where otherwise expressly stated, this Brief Summary is not intended to identify key or essential features of the claimed subject matter, nor is it intended to limit the scope of the claimed subject matter.

Also provided in this Brief Summary are some exemplary numbered embodiments of the present disclosure; details related to these numbered embodiment are provided in the Detailed Description.

1. A composition comprising an additive in a polymer phase, wherein:
   a. the additive is soluble in a solvent;
   b. the polymer phase comprises an organic polymer and is essentially insoluble in the solvent;
   c. the composition is a solid at temperatures below 25° C. and a viscous fluid with a Melt Flow Index of 2.5-30 g/10 min at a temperature above the melt temperature of the composition; and
   d. the composition has a weight percent of the additive based on the weight of the composition and a weight percent of the polymer phase based on the weight of the composition, where the sum of the weight percent of the additive and the weight percent of the polymer phase is greater than 90%.
2. The composition of embodiment 1 where the solvent is water.
3. The composition of embodiment 1 in a form that can be used in an additive manufacturing process, e.g., FFF, such as a powder or fiber.
4. The composition of embodiment 1 in a form of a filament.
5. The composition of embodiment 4 wherein the filament has a diameter of 1-5 mm.
6. The composition of embodiment 1 in the form of a granule.
7. The composition of embodiment 1 wherein the weight percent of the additive in the composition is 1-60%.
8. The composition of embodiment 1 wherein the additive has an average particle size of 20-400 microns.
9. The composition of embodiment 1 wherein the additive comprises an inorganic salt.
10. The composition of embodiment 1 wherein the additive comprises an inorganic salt comprising a cation and an anion, where the cation is selected from sodium, potassium and magnesium and the anion is selected from chloride, bromide, iodide, sulfate, phosphate, carbonate, bicarbonate.
11. The composition of embodiment 1 wherein the additive comprises a water-soluble organic compound.
12. The composition of embodiment 11 wherein the water-soluble organic compound is a sugar.
13. The composition of embodiment 11 wherein the water-soluble organic compound is an organic carboxylic acid or a salt thereof.

14. The composition of embodiment 1 wherein the polymer phase comprises a bioabsorbable polymer.
15. The composition of embodiment 1 wherein the polymer phase comprises a bioabsorbable polymer comprising segments selected from polyester, polyanhydride, poly(hydroxybutyrate), and polyether.
16. The composition of embodiment 1 wherein the polymer phase comprises a non-bioabsorbable polymer.
17. The composition of embodiment 16 wherein the polymer phase comprises a non-bioabsorbable polymer selected from polyethylene, nylon, thermoplastic polyurethane, polypropylene, polyetheretherketone, polyaryletherketone and polyethylene terephthalate.
18. The composition of embodiment 1 comprising residual monomer at a concentration of <2% by weight.
19. The composition of embodiment 1 comprising tin at a concentration of <200 ppm.
20. The composition of embodiment 1 comprising one or more heavy metal excluding tin, at a concentration of <50 ppm.
21. A method of additive manufacturing, the method comprising:
    a. melting a solid composition to provide a molten composition, the molten composition comprising an additive and a polymer phase according to any of embodiments 1-20;
    b. performing additive manufacturing to form an article from the molten composition; and
    c. contacting the article with a solvent, where the additive is soluble in the solvent, under conditions which at least partially dissolves the additive but not the polymer phase, to form a porous form of the article.
22. The method of embodiment 21 wherein the solvent comprises water.
23. The method of embodiment 21 wherein the solvent is water.
24. The method of embodiment 21 wherein the solvent dissolves at least 30% of the added additive.
25. The method of embodiment 21 wherein the solvent dissolves at least 80% of the added additive
26. The method of embodiment 21 wherein the solid composition is melted at a temperature of 50-450° C.
27. The method of embodiment 21 wherein the additive manufacturing process is performed under an atmosphere of <10% relative humidity.
28. The method of embodiment 21 wherein the additive manufacturing method is fused filament fabrication (FFF).
29. The method of embodiment 21 wherein the porous form of the article comprises a plurality of holes of a maximum cross section of 0.5-50 mm.
30. The method of embodiment 21 wherein the composition has a density and the article has a density, and the article has a density of less than 85% of the density of the composition.
31. The method of embodiment 21 wherein the conditions comprise a temperature of greater than 20° C.
32. The method of embodiment 21 wherein the porous article comprises pores of a maximum cross section of 20-400 microns.
33. The method of embodiment 21 further comprising sterilizing the article by a method selected from treatment with ethylene oxide, gamma, e-beam, dry heat and steam processes.
34. The method of embodiment 21 further comprising removing residual solvent from the article such that the residual solvent is less than one weight percent based on the weight of the porous form of the article.
35. A method of additive manufacturing, the method comprising:
    a. providing a composition comprising an additive in a polymer phase according to any of embodiments 1-20;
    b. extruding the composition into a fiber;
    c. melting the fiber to provide a molten composition, the molten composition comprising an additive and a polymer phase;
    d. performing additive manufacturing to form an article from the molten composition;
    e. contacting the article with a solvent, where the additive is soluble in the solvent, under conditions which at least partially dissolves the additive but not the polymer phase, to form a porous form of the article; and
    f. removing residual solvent from the porous form of the article such that the residual solvent is less than one weight percent based on the weight of the porous form of the article.

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments. Other features, objects and advantages will be apparent from the description, the drawings, and the claims.

BRIEF DESCRIPTION OF THE DRAWINGS

Exemplary features of the present disclosure, its nature and various advantages will be apparent from the accompanying drawings and the following detailed description of various embodiments. Non-limiting and non-exhaustive embodiments are described with reference to the accompanying drawings in which.

DETAILED DESCRIPTION

Figure 1:
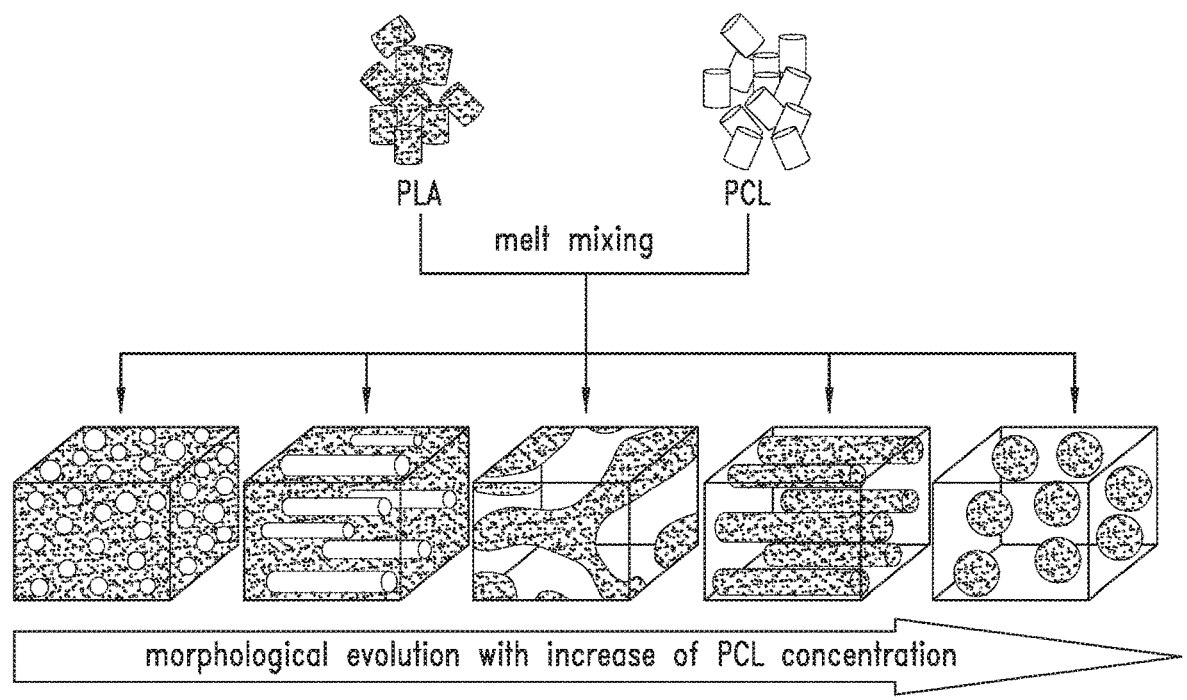
FIG. 1 shows five different exemplary phase morphologies for an additive within a polymer phase, e.g., a distributed phase within a continuous phase.

The present invention may be understood more readily by reference to the following detailed description of preferred embodiments of the invention and the Examples included herein.

Briefly stated, the present disclosure provides methods for additive printing, polymeric compositions for use therein, and products made thereby, including products having porosity or microporosity, i.e., porosity that is greater than that created by the additive printing process itself. Thus, the present disclosure provides compositions useful in additive manufacturing, methods of conducting additive manufacturing that make use of the compositions of the present disclosure, and products made by the additive manufacturing process, and related subjects.

Porous and microporous parts prepared by additive manufacturing as disclosed herein are useful in medical and non-medical applications. The parts are prepared from a composition containing both a solvent soluble component and a solvent insoluble component. After a part is printed by an additive manufacturing process it is exposed to solvent to extract solvent soluble component away from the printed part, resulting in a part having an altered surface morphology.

As one exemplary application, the compositions and related methods are useful in the production of medical devices, such as devices that will contact the body of a patient, either internally or externally. The present disclosure provides compositions and methods that facilitate the ability to create customized, patient specific implants with increased and precision designs. The compositions and methods of the present disclosure support the creation of advanced scaffolds, artificial partial or complete organs, targeted pharmaceutical delivery, and many other applications.

The present disclosure provides compositions useful for forming parts by additive manufacturing processes. The compositions will contain at least two components, where one of the components is essentially insoluble in a selected solvent while the other component is substantially soluble in the selected solvent. Thus, when the composition is immersed or otherwise exposed to the selected solvent for a period of time, one of the components will dissolve in the solvent while the other component will not dissolve in the solvent. The process whereby the composition is exposed to the selected solvent will be referred to herein as the extraction step or extraction process.

It is not necessary that the relatively insoluble component be completely insoluble in the solvent, however that component should be essentially insoluble in the solvent during the extraction process. As used herein, essentially insoluble means that no more than 5 wt % of the insoluble component dissolves in the solvent during the period of time of solvent exposure, and in embodiments no more than 4 wt %, or no more than 3 wt %, or no more than 2 wt %, or no more than 1 wt % of the relatively insoluble component will dissolve in the solvent during the extraction step.

Likewise, it is not necessary that all of the relatively soluble component of the composition dissolves in the selected solvent during the extraction process. However, the soluble component should dissolve in the solvent much more readily than does the insoluble component, so that little or no insoluble component dissolves in the solvent during the time which the soluble component is dissolving in the solvent.

The soluble component may be referred to herein as the additive, or the additive component, or the additive phase. The insoluble component may be referred to herein as the matrix, or the matrix phase. In one embodiment, the soluble component is the minor component of the composition (<50 wt %) and the insoluble component is the major component (>50 wt %). Thus, the insoluble component may be referred to herein as providing or being the continuous phase while the insoluble component may be referred to as providing or being the discontinuous phase.

In one embodiment, the component which is relatively insoluble in the selected solvent will be a polymer, e.g., an organic polymer. This component may be a single polymer, e.g., polyethylene or polylactide, or it may be a blend of polymers, e.g., a blend containing polyethylene and polylactide. In one embodiment, the insoluble component is a single polymer composition. Thus, the present discloses a composition comprising an additive in a polymer phase, where the additive is soluble component of the composition and is soluble in a solvent while the polymer phase is the insoluble component of the composition and comprises an organic polymer and is essentially insoluble in the solvent.

The compositions of the present disclosure include a component that is soluble in a selected solvent, where this component may be referred to as the additive phase. Exemplary materials from which to make an additive phase include organic small molecules, organic polymers, and inorganic particles. Suitable organic small molecules includes sugars and carboxylic acids including salts thereof. Suitable organic polymers include polyesters and polyanhydrides. Suitable inorganic particles include inorganic salts such as sodium chloride and hydroxyapatite.

In one embodiment, the component which is soluble in the selected solvent will be a polymer, e.g., an organic polymer. In another embodiment, the component which is soluble in the selected solvent will be a salt. In either case, this soluble component may be referred to as the additive component of the composition, or the additive phase.

Optionally, the component which is relatively soluble in the selected solvent will be a polymer, for example, an organic polymer. This soluble component may be a single polymer, e.g., polyethylene glycol or polyvinylalcohol, or it may be a blend of polymers, e.g., a blend containing polyethylene glycol and polyvinylalcohol. In one embodiment, the soluble component is a single polymer. In one embodiment, the soluble component is a blend of two or more polymers. In one embodiment, the soluble component is or includes polyalkylene glycol, e.g., polyethylene glycol (PEG), blends of PEG and polypropylene glycol (PPG) as found in PLURONICS polymers from Dow Du Pont (Midland, Mich.), or PPG which may be dissolved in an alcohol solvent such as methanol, while the polymer phase, which is the insoluble component, is a biodegradable polymer such as a polymer including polyester and/or polyanhydride segments, e.g., segments produced from glycolide (polyglycolide, PGA), lactide (polylactide, PLA), dioxanone (polydioxanone, PDO), trimethylene carbonate (polytrimethylene carbonate, TMC), caprolactone (polycaprolactone, PCL), hydroxyalkanoates such as hydroxybutyrate (polyhydroxyalkanoate, e.g., PHB), or mixtures thereof such as polylactide-co-glycolide (PLGA).

The additive phase may be formed from an organic polymer that has little or no solubility in water. An example of such an additive phase is polylactide which has a solubility in water of less than 0.1 g/L. In one embodiment, the additive phase is insoluble in water, or essentially insoluble in water having a solubility of less than 1 g/L, or less than 0.5 g/L or less than 0.1 g/L.

A polymer phase in the composition, whether present as the soluble or the insoluble component, or present in both, may be entirely biodegradable or comprise biodegradable components. However, the polymer phase is not necessarily biodegradable and in another embodiment the polymer phase is non-biodegradable. In one embodiment, the polymer phase comprises a mixture of biodegradable and non-biodegradable materials. Exemplary biodegradable polymers include polyesters and polyanhydrides. In one embodiment the biodegradable polymer comprises polyester segments, such as those derived from glycolide, lactide, dioxanone, trimethylene carbonate, caprolactone, citric acid, hydroxyalkanoates, and others.

In one embodiment, the insoluble component of the composition is a polymer phase formed entirely from, or comprising, a non-degradable polymer. Examples of suitable non-degradable polymers include nylon, polypropylene, polyetheretherketone, polyaryletherketone, polyterephthalate, polyvinylalcohol, polyurethane, thermoplastic polyurethane (TPU), and polypropylene.

Optionally, when the polymer phase comprises a non-bioabsorbable polymer selected from polyethylene, nylon, thermoplastic polyurethane, polypropylene, polyetheretherketone, polyaryletherketone and polyethylene terephthalate, the additive is soluble in an organic solvent such as chloroform while the polymer phase is not soluble in the organic solvent, e.g., chloroform, and the additive is a polymer including polyester and/or polyanhydride segments, e.g., segments produced from glycolide (polyglycolide, PGA), lactide (polylactide, PLA), dioxanone (polydioxanone, PDO), trimethylene carbonate (polytrimethylene carbonate, TMC), caprolactone (polycaprolactone, PCL), hydroxyalkanoates such as hydroxybutyrate (polyhydroxyalkanoate, e.g., PHB), or mixtures thereof such as polylactide-co-glycolide (PLGA).

Optionally, the component which is relatively soluble in the selected solvent is not a polymer. For example, the soluble component may be a salt.

In one embodiment, the additive phase, which may be distributed within a polymer phase, or may contain a polymer phase distributed within the additive phase, comprises a water soluble inorganic salt. The inorganic salt is preferably a biocompatible inorganic salt such as sodium chloride. Sodium chloride is soluble in water at room temperature at a level of 359 g/L. In one embodiment, the inorganic salt is soluble in water at room temperature to an extent of at least 100 g/L, or at least 200 g/L, or at least 300 g/L.

The composition of the present disclosure comprises a solvent soluble component and a solvent insoluble component. Taken together, these two components may comprises 100% by weight of the composition. However, in other embodiments, these two components comprise the majority of the composition, i.e., greater than 50% by weight of the composition, or at least 60 wt %, or at least 70 wt %, or at least 80 wt %, or at least 90 wt %, or at least 95 wt % of the total weight of the composition of the present disclosure. Thus, in one embodiment the present disclosure provides a composition comprising an additive in a polymer phase, wherein the additive is soluble in a solvent, the polymer phase comprises an organic polymer and is essentially insoluble in the solvent, and the composition has a weight percent of the additive based on the weight of the composition and a weight percent of the polymer phase based on the weight of the composition, where the sum of the weight percent of the additive and the weight percent of the polymer phase is greater than 90%. As noted previously, the additive may be a polymer or polymer blend, or it may be a salt.

As mentioned herein, in one aspect the present disclosure is a composition comprising a distributed phase (also referred to as, e.g., the soluble phase or soluble component) and a continuous phase (also referred to as, e.g., the insoluble phase or insoluble component). The composition is a solid at room temperature, so that it can be formed into, and hold, a suitable shape such as a granule or filament. However, at an elevated temperature the composition will melt and become capable of flowing. Upon cooling, the composition will return to a solid state. When used in additive manufacturing, the cooled material will provide the shape of the desired printed material. Thus, the composition may be described as thermoplastic. Either one or both of the continuous or distributed phase may be described as having thermoplastic properties.

Thermoplastic compositions as provided herein for additive manufacturing, such as FFF printing and other similar melt-extrusion additive manufacturing processes, can consist of one or multiple phases, depending on the compatibility and solubility of components as well as the intended manufacturing process. In specific cases, a composition of the present disclosure that is useful for additive manufacturing may include one or more continuous phases, and/or one or more distributed phases. For example, the composition may have two continuous phases formed from two different materials that are immiscible with another. Likewise, the composition may have two distributed phases formed from two different materials that are immiscible with one another. In another embodiment, the composition has a single continuous phase formed from two or more materials that are miscible with one another. Similarly, in another embodiment, the composition has a distributed phase that is formed from two or more materials that may or may not be miscible with one another.

A continuous phase may be identified through the connectivity of a phase over a certain length. For example, in the instance where the continuous phase comprises a polymer that is electrically conductive, the continuous phase allows for current to flow through the continuous phase length.

A continuous phase can have a non-structured form in which the continuous phase has a random form. A continuous phase can take several forms, including rod structures, foam structures, particulates where the particulates are contacting each other, film structures, lamellar structures, fiber-like structures and laminate structures.

As mentioned previously, the continuous phase may be or comprise a polymer, e.g., a thermoplastic polymer. The composition comprising the polymeric continuous phase will also comprise a distributed phase comprising a porogen or other additive that has been mixed with the polymer but maintains a separate phase from the polymeric continuous phase. When a relatively large amount of additive has been combined with the polymer, the additive may be present in such a large amount that it forms a continuous phase, and the polymer mixed therewith forms a distributed phase within the continuous phase.

In some embodiments, the composition comprises multiple continuous phases. Multiple continuous phases may take the form of continuous fibers within a continuous coating, co-continuous foam-like structures, lamellar structures, side-by-side phases, and other forms. In an exemplary embodiment, the composition comprises two continuous polymeric phases, where the composition is optionally in the form of a single monofilament, and the two continuous polymeric phases are optionally made from polyglycolide and polycaprolactone, which take the form of a continuous polyglycolide coating surrounding one or more polycaprolactone filaments. The monofilament is printed into a part, e.g., a medial implant, using an additive manufacturing process, such as a FFF process, which retains the phase separation existing in the polymer format. After implantation, the polyglycolide degrades via hydrolysis within 2 months, leaving a residual structure with the same net shape provided by the collection of small polycaprolactone fibers and having 50% of the original part weight. This is useful through the provision of an initial part with high strength and density which transitions into a low density, high surface area implant which supports ingrowth of newly forming tissues.

The compositions of the present disclosure are thermoplastic in that they are solid at room temperature, may be heated to reach a fluid molten state, and will return to a solid state upon cooling.

In one embodiment, the compositions of the present disclosure are solid at ambient temperature, e.g., 20-25° C., but fluid at an elevated temperature which is the operating temperature of an additive manufacturing process. Different additive manufacturing process utilize different operating temperatures, which typically fall within the range of 50–450° C. In various embodiments, the compositions of the present disclosure become fluid at a temperature which may be referred as the melting point of the composition, where depending on the composition, that melting point is greater than about 50° C., or about 75° C., or about 100° C., or about 125° C., or about 150° C., or about 175° C., or about 200° C., or about 225° C., or about 250° C., or about 275° C., or about 300° C., or about 325° C., or about 350° C., or about 375° C., or about 400° C., or about 425° C., or about 450° C., including ranges thereof. For example, in one embodiment the compositions of the present disclosure have a melting point of greater than about 50° C., e.g., about 50-100° C., or about 50-150° C., or about 50-200 C. In another embodiment, the compositions of the present disclosure have a melting point of greater than about 75° C., e.g., about 75-125° C., or about 75-150° C., or about 75-175° C., or about 75-200° C., or about 75-225° C. As used herein, a temperature of "about °X", where X is a stated temperature, refers to stated temperature X±5° C. of temperature X, i.e., the stated temperature ±5° C. of the stated temperature.

The melting point of a composition of the present disclosure may be measured according to ASTM or ISO standardized procedures. For instance, ASTM D7138-16 may be used to determine the melting temperature of synthetic fibers. As another example, ASTM D3418 describes the use of differential scanning calorimetry (DSC) to measure melting point.

When the composition is in a molten state, e.g., above its melting point, it may be characterized in terms of its melt flow properties, e.g., its Melt Flow Index (MFI) or Melt Flow Rate (MFR). A useful test to measure the ability for a material to flow is Melt Flow Index (MFI). This test can be applied to viscous fluids comprising crystalline, semicrystalline, or amorphous thermoplastic materials to determine flow rate of a material under a given condition of temperature and pressure, typically provided as a weight (in grams) per time (in minutes) that a certain composition flows through a given orifice size. This test is a non-specific analysis of the ability of a material to flow, and is useful to determine the effect of temperature or pressure on the composition. For FFF and FDM, it is desirable to determine a temperature range suitable for generating an MFI value of between about 2.5-30 grams per 10 minutes, which translates to preferred FFF or FDM process temperatures for a given composition.

ASTM and ISO publish standardized procedures for measuring melt flow.

See, e.g., ISO 1133, JIS K 7210, ASTM D1238 as general methods. In one embodiment, melt flow is measured according to ISO-1122-1 Procedure A. In another embodiment, melt flow is measured according to ASTM A1238 Procedure A. In another embodiment, melt flow is measured according to ISO 1122-2. In another embodiment, melt flow is measured according to ASTM D1238. The Instron Company (Norwood, Mass., USA) sells instruments that can be used to measure melt flow according to these procedures, e.g., their CEAST Melt Flow Testers MF10, MF20, and MF30 models. Zwick Roell AG (Ulm, Germany) is another company that manufactures and sells suitable melt flow testers.

Thus, the compositions of the present disclosure may optionally be characterized in terms of their MFI. MFI generally corresponds to how viscous the fluid composition is, where a higher MFI is a less viscous composition. For additive manufacturing, a wide range of composition viscosities can be utilized, however, certain MFI values are particularly suitable and are provided by the compositions of the present disclosure. In one embodiment, the compositions of the present disclosure have a MFI of about 2.5-30 g/10 min at a temperature above the melt temperature of the composition and within the operating temperature of the additive manufacturing process, e.g., FFF. In various embodiments, the compositions of the present disclosure are characterized by a MFI in grams, as measured over a 10 minute period, of about 2.5-30, or about 2.5-25, or about 2.5-20, or about 2.5-15, or about 2.5-10, or about 5-30, or about 5-25, or about 5-20, or about 5-15, or about 10-30, or about 10-25, or about 10-15, or about 15-30, or about 15-25, or about 15-20, or about 20-30, or about 25-30. As used herein, about X-Y grams refers to each of X and Y±10%, e.g., about 2.5 refers to 2.25-2.75, while about 30 refers to 27-33 grams.

With an increase in percentage solid distributed phase in the composition, the ability for a material to flow is reduced, mirrored by a reduction in MFI value at the same temperature. Various components can serve to increase the viscous flow of a composition, including plasticizers like oils, surfactants, organic solvents such as water, monomers, low molecular weight polymers, and oligomers. For the latter three, it is optional to have these remaining in a polymer as unreacted residuals and their presence may assist in downstream processing like extrusion or FFF printing.

Thus, in one embodiment, the present disclosure provides a composition comprising an additive in a polymer phase, wherein: a) the additive is soluble in a solvent; b) the polymer phase comprises an organic polymer and is essentially insoluble in the solvent; and the composition is a solid at temperatures below 25° C. and a viscous fluid with a Melt Flow Index of 2.5-30 g/10 min at a temperature above the melt temperature of the composition. Optionally, the composition has a weight percent of the additive based on the weight of the composition and a weight percent of the polymer phase based on the weight of the composition, where the sum of the weight percent of the additive and the weight percent of the polymer phase is greater than 90%.

The additive phase may comprise particulate that is not generally spherical. For example, non-spherical crystals such as cuboidal sodium chloride salt may be present in the composition. Thus, the additive phase may comprise structures with aspect ratios greater than 1:1. In certain cases, longer aspect ratios generated from chopped filament could be added in concentrations to act as a reinforcing element to increase strength or modulus, or improve fatigue resistance. For example, chopped filaments with diameter of 5-50μ, e.g., 12 μm and an aspect ratio of between 1000:1 and 10:1, e.g., about 100:1, may be used to create a fiber-reinforced filament. During processing, an additive phase comprising these filaments will generate loading with filaments essentially aligned in the process direction, thereby increasing mechanical performance along that direction.

The particulate may vary in size from about 50 nm to 0.5 mm. In one embodiment, the mean particle size may be 20-400 µm. In another embodiment, the mean particle size may be 400-800 µm. Optionally, the particulates have a broad size distribution with a standard deviation of the mean particle size of greater than ±30%. Alternatively, the particles have a narrow size distribution with a standard deviation of the mean particle size of less than ±30%.

In one embodiment, the particulates have a size distribution with a standard deviation of 10% or less. The distributed phase may include particulates of a variety of diameters. The distributed phase may contain a combination of particulates that have distinctly different size ranges. In one embodiment, particulates with a mean particle size of 20-400 µm are combined with particulates with a mean particle size of 400-800 µm.

The desired mean size and size distribution of the particulate can be generated by various techniques. The size range to be used can be prepared by a crystallization process, a precipitation process, a sieving process, a mechanical grinding or milling process, a cutting or chopping process, and extrusion process or a combination of these processes.

In one embodiment, the additive or distributed phase comprises an inorganic salt, e.g., an inorganic salt comprising a cation and an anion, where the cation is selected from sodium, potassium and magnesium and the anion is selected from chloride, bromide, iodide, sulfate, phosphate, carbonate, bicarbonate. In one embodiment, the additive or distributed phase comprises a water-soluble organic compound, e.g., a sugar or an organic carboxylic acid or a salt thereof.

In one embodiment, the continuous phase comprises a bioabsorbable polymer, e.g., a bioabsorbable polymer comprising segments selected from polyester, polyanhydride, poly(hydroxybutyrate), and polyether. In one embodiment, the continuous phase comprises a non-bioabsorbable polymer, e.g., a non-bioabsorbable polymer selected from polyethylene, nylon, thermoplastic polyurethane, polypropylene, polyetheretherketone, polyaryletherketone and polyethylene terephthalate.

Table A shows the solubility of various polymers in various solvents. The present disclosure provides two phase compositions in a form suitable for additive manufacturing, which contains a distributed phase and a continuous phase. The distributed phase may comprise additives that are soluble in solvents that do not dissolve the continuous phase which comprise polymer. Alternatively, the additive phase may comprise the bulk of the composition, and the polymer phase is distributed within the continuous additive phase. In the Table, PGA stands for poly(glycolic acid) or poly (glycolide), PLA stands for poly(lactic acid) or poly(lactide), PCL stands for poly(ε-caprolactone), PVA stands for poly (vinyl alcohol) and PEG stands for poly(ethylene glycol).

TABLE A

| Polymer | Suitable Solvent for Extraction | Suitable for Non-Extraction |
| --- | --- | --- |
| PGA | HFIP, HFA | Chlorinated solvents, most organic solvents, water |
| PLA | Chloroform | Water, IPA, |
| PCL | Acetone, Chloroform, | Water, IPA |
| PVA | Water | Ethanol |
| PEG | Water, acetone, alcohols, chlorinated solvents | Nonpolar solvents |

In one embodiment, the composition, optionally in filament or granulated form, is prepared containing polylactide as the polymer phase and polyvinylalcohol as the additive phase. Optionally, the polymer phase is the continuous phase. In another option, the polymer phase is the distributed phase. The weight ratio of polylactide to polyvinylalcohol can be varied to provide the desired amount of porosity. In one embodiment, the majority of the composition on a weight basis is continuous phase. In optional embodiments, the distributed phase provides 10-50%, or 10-40%, or 10-30%, or 10-20%, or 20-50%, or 20-40%, or 20-30%, or 30-50%, or 30-40% or 40-50% of the weight of the compositions, with the remainder being continuous phase and additives. For example, a part may be prepared from polylactide as the continuous phase and polyvinylalcohol as the distributed phase at a 60:40 ratio in order to create a tissue scaffold. To generate microporosity within the printed part, the part may be soaked in an agitated room temperature water bath overnight to extract the polyvinylalcohol.

Optionally, a polymer present in a composition of the present disclosure, e.g., a polymer present as the insoluble component, contains one or more non-polymeric components. Exemplary non-polymeric components include antioxidants, stabilizers, viscosity modifiers, extrusion aids, lubricants, plasticizers, colorants and pigments, and active pharmaceutical ingredients. In some cases, such a non-polymeric component can contribute to more than one of the above-mentioned functions. In various embodiments, the sum of the non-polymeric components, on a weight percent basis based on the total weight of the continuous phase, is less than 10, or less than 9, or less than 8, or less than 7, or less than 6, or less than 5, or less than 4, or less than 3, or less than 2, or less than 1 wt %.

Suitable antioxidants, which may be used to minimize process and thermally induced oxidation include, e.g., primary antioxidants such as hindered phenols, and secondary antioxidants such as thioethers. Suitable antioxidants are biocompatible in the amounts used in the composition. For medical applications, biocompatible antioxidants are preferred, for example Vitamin E.

Suitable colorants, which impart color to the manufactured part, are optionally biocompatible in the amounts used in the composition. For medical applications, biocompatible colorants are preferred. Exemplary biocompatible colorants include D&C Violet #2, D&C Blue #6, D&C Green #6, (Phthalocyaninato(2-)) copper, and others as described in FDA 21 CFR Part 73 and 74. The colorant should be used in an amount effective to achieve the desired appearance, e.g., about at 0.05 wt % of D&C Violet #2 can be used to create violet-colored devices. In one embodiment, the colorant is an FDA approved colorant present in the composition at a concentration of 0.1-0.5 wt %, while in other embodiments the colorant concentration is 0.2-0.5 wt %, or 0.3-0.5 wt %, or 0.4-0.5 wt %. In one embodiment the colorant concentration does not exceed about 0.5 wt %.

Suitable viscosity modifiers, which typically reduce the viscosity of a molten form of the composition, include oils, low molecular weight polymers and oligomers, monomers, and solvents. The use of viscosity modifiers reduces the energy requirement to melt the composition and allows for better flow and layer adhesion during the printing process. In one embodiment, PEG with a molecular weight of about 1,000 is included in the continuous phase at 0.5 wt %. When the major component of the continuous phase is poly(lactide), the addition of 0.5 wt % PEG with molecular weight of 1,000 provides a composition that is able to be processed through a FFF process at 15° C. less than a corresponding monofilament without the viscosity modifier. In one embodiment, the composition of the present disclosure contains a viscosity modifier which is a polyethylene glycol having a molecular weight of less than 5,000, where the viscosity modifier is present in the composition at a concentration of less than 1 wt % of the composition.

In one aspect, the present disclosure provides a composition comprising a distributed phase in a continuous phase. The distributed phase is optionally soluble in a solvent. The continuous phase optionally comprises an organic polymer and is insoluble or essentially insoluble in the solvent. Optionally, the composition is a solid at temperatures below 25° C. and a viscous fluid above its melt temperature. For example, upon melting, the composition has a Melt Flow Index of about 2.5-30 g/10 min at a temperature above the melt temperature of the composition. Optionally, the composition is a solid at temperatures below 25° C. and is a viscous liquid at an elevated temperature. For example, at an elevated temperature, the composition has a Melt Flow Index of about 2.5-30 g/10 min. The elevated temperate may be in the range of 50-450° C., which is typically employed for FFF additive manufacturing. Optionally, the composition has a weight percent of the distributed phase based on the weight of the composition and a weight percent of the continuous phase based on the weight of the composition, where the sum of the weight percent of the distributed phase and the weight percent of the continuous phase is greater than 90%. These and other aspects of the composition are described hereinafter.

In one embodiment, the polymer phase, which may be either the continuous phase or the distributed phase, comprises more than one polymer. In another embodiment, the polymers of the polymer phase are non-phase separated. In another embodiment, the polymers of the polymer phase can be phase separated. When the polymer phase comprises more than one polymer, the two or more polymers may provide different function to the composition, where a polymer may provide, e.g., antioxidant performance, enhanced stability to the composition, viscosity modification, an aid to the extrusion of the composition, lubricant performance, plasticizer performance, coloration, and biological activity.

In addition to a continuous phase, the compositions of the present disclosure which are useful for additive manufacturing include a distributed phase. The distributed phase is identified as a non-continuous inclusion of material into the overall composition and can comprise one or a variety of geometries. Illustrations of the distribution of a distributed phase in a continuous phase is shown in the boxes of FIG. 1. As mentioned previously, the distributed phase may be a polymer that is distributed in a non-polymeric continuous phase. As another option, the distributed phase may be a porogen or other additive that is combined with a polymeric phase that forms the continuous phase. Thus, the polymer phase may be the continuous phase, in which case the additive is the distributed phase, or the additive may be in the continuous phase in which case the polymer is in the distributed phase.

Optionally, the additive phase may be in the form of a particulate. For instance, in some versions the particulates are identified as a microsphere with regular and smooth wall surface. These microspheres may be created, e.g., by emulsion processes or through a variety of other techniques used to create microspheres. Alternatively, the particulate could comprise a collection of irregular shaped particulates. The irregular shaped particulates can comprise particles with smooth surfaces, rough surfaces or a combination thereof. The particulates may comprise particles with jagged edges. Irregular shaped particulates may be generated through a milling technique such as jet milling, cryomilling or ball milling to reduce the particulate size to an application-appropriate diameter.

The additive phase, which may be either the continuous phase or the distributed phase of the composition, may be defined herein by its solubility in at least one solvent. In one embodiment, the additive phase is soluble in a solvent or solvent system in which the polymer phase has limited solubility. This difference in solubility is helpful in order to create a structure with immediate or time-delayed porosity or microporosity based on the dissolution and subsequent separation of the additive phase from the polymer phase.

In some embodiments, the continuous phase is essentially insoluble in water, while the distributed phase dissolves or dissociates in water. Through this property, microporous parts may be generated through the selective dissolution of the distributed phase prior to implantation of the formed part in a patient. Conversely, it may be beneficial to implant a formed part containing a soluble distributed phase, where the distributed phase is released from the implant after the part is implanted in the patient. The one or more distributed phases and the one or more continuous phases may be selected such that a distributed phase is soluble in a solvent while the components of the continuous phase are essentially insoluble in the same solvent.

In another embodiment, the additive phase comprises an organic polymer that is soluble in an organic solvent, while the polymer phase is an organic polymer that is not soluble in the same organic solvent. An example of such a composition is when the additive phase is polycaprolactone (PCL). PCL is soluble in chloroform, dichloromethane, carbon tetrachloride, benzene, toluene, cyclohexanone and 2-nitropropane at room temperature, and has a low but significant solubility in acetone, 2-butanone, ethyl acetate, dimethylformamide and acetonitrile. PCL is insoluble in ethanol, petroleum ether and diethyl ether. The composition may have a polymer phase which is not soluble in one or more of the listed solvents. For example, although PCL has a low solubility in acetone, poly(glycolide-block-trimethylene carbonate) is essentially insoluble in acetone. Accordingly, a composition of PCL as a distributed phase in poly(glycolide-block-trimethylene carbonate) as the continuous phase provides a composition of the present disclosure. As another example, a composition of PCL as a continuous phase within which poly(glycolide-block-trimethylene carbonate) as the distributed phase provides a composition of the present disclosure.

In a preferred embodiment, the distributed phase is stable within the continuous phase such that the at least one distributed phase can be incorporated into the at least one continuous phase during a filament formation process. The phase separation between the continuous and distributed phases in the solid form should remain stable during storage, and throughout subsequent additive manufacturing processes such that the phases remain separated through to the final part. After the final part is formed, a solvent may be utilized to remove the soluble distributed phase or the part may be implanted to allow for a delayed porosity generation through in situ dissolution.

The distributed phase is preferably chemically compatible with the continuous phase. For example, during storage, the distributed phase should not cause degradation of the continuous phase, including chain cleavage or oxidation, and the distributed phase should not initiate cross-linking or other chain modification to the continuous phase. For parts intended for medical applications, each of the continuous and distributed phases should be biocompatible, and the cellular response to the presence of the distributed phase, including ions resulting from dissolution, or byproducts or processing aids which are delivered with the implanted part as part of the distributed phase should not be physically or medically harmful to a patient who receives the additive manufactured implant of the present disclosure.

Compositions comprising a distributed phase and a continuous phase are characterized by the separation of distinct phases within the composition. In one embodiment, the distributed phase is uniformly dispersed throughout the composition, but in some cases having the distributed phase located preferentially in one or more area of the composition may be advantageous. Additionally, the distributed phase preferably does not display agglomeration of particulates, but instead individual distributed units are surrounded by material from the continuous phase. These properties may be obtained by proper selection of the relative surface free energy, charge, hydrophobicity, density, shape, size, or other cohesive forces of the distributed versus the continuous phase.

In various embodiment, the distributed phase is introduced into the continuous phase by melt blending. The distributed phase may be added to the molten continuous phase, or molten continuous phase may be added to the distributed phase, and upon suitable mixing, a homogenous composition is formed. Alternatively, the distributed phase may be added to the reactants used to form the continuous phase, i.e., the monomer which upon polymerization form the continuous phase. This latter option is suitable so long as the distributed phase does not dissolve in the reaction mixture used to form the continuous phase, but instead disperses throughout that reaction mixture.

In other embodiment, the additive phase is introduced to the polymer phase by melt blending. The additive phase may be added to the molten polymer phase, or molten polymer phase may be added to the additive phase, and upon suitable mixing, a homogenous composition is formed. Alternatively, the additive phase may be added to the reactants used to form the polymer phase, i.e., the monomer which upon polymerization forms the polymer phase. This latter option is suitable so long as the additive phase does not dissolve in the reaction mixture used to form the polymer phase, but instead disperses throughout that reaction mixture.

Depending on how the continuous and distributed phases are combined, the resulting composition may have the distributed phase located uniformly throughout the continuous phase, or the distributed phase may be located preferentially in specific regions of the continuous phase. For instance, the distributed phase may be present predominantly or exclusively in the outermost part of a filament formed of continuous and distributed phase.

The present disclosure provides monofilaments that are useful for forming articles by additive manufacturing processes. These monofilaments may be described in various ways, such as shape, weight, and physical properties.

In one embodiment, the monofilament has a circular cross-section, i.e., the monofilament is round. As such, the monofilament may be described as having a diameter. In one embodiment, the diameter of the monofilament is within the range of 1.5 to 3.5 mm. In one embodiment the diameter is 1.75 mm. In another embodiment the diameter is 3.0 mm. In one embodiment the diameter does not vary by very much along the length of the filament. For example, the diameter may be selected from a value within the range of 1.5-3.5 mm, and the diameter variation is characterized as being no more than ±0.1 mm along the length of the monofilament. In one embodiment, the diameter does not vary by more than 0.1 mm, e.g., the diameter may be described as 3.0±0.1 mm. In another embodiment the diameter does not vary by more than 0.05 mm, e.g., the diameter may be described as 1.75±0.05 mm.

The monofilaments of the present disclosure are useful in additive manufacturing. In one embodiment the monofilaments are cut into a useful length, the useful length corresponding to a useful mass. A useful mass of monofilament of the present disclosure is about 200-1,500 grams for additive manufacturing. Parts printed by additive manufacturing may have various masses, where it is convenient that a length of monofilament provide sufficient mass to produce an entire part, but the length not be so long that the monofilament is kept in the printing machine for a long time before it is completely consumed. The monofilament in the printing machine is subject to degradation by, e.g., oxidation and hydrolysis, and so from a stability perspective it is preferred that the monofilament not be in the machine so long that an appreciable amount of degradation occurs. In view of these considerations, the present disclosure provides a single (unbroken) length of monofilament that weighs about 200-1,500, while in other embodiments the mass is about 800-1,200 grams, or about 1,000 grams, i.e., 950-1050 grams. The present disclosure provides a method of forming monofilament that includes cutting the monofilament into lengths which each provide a mass of about 1,000 grams.

The monofilaments of the present disclosure may be characterized by their length. In one embodiment, the length of monofilament is less than 500 meters. In one embodiment, the length of monofilament is less than 400 meters. In one embodiment the length of monofilament is within the range of 10-500 meters, and in another embodiment the length of monofilament is within the range of 10-400 meters. In one embodiment, the monofilament length is 250-350 meters. Monofilament of these lengths may be wound around a spool and used in additive manufacturing. A length of about 300-400 meters provides a mass of monofilament of about 1 kg. In one embodiment, the compositions, and accordingly the monofilaments, of the present disclosure have a density of about 1.4 g/cm$^3$ and accordingly a monofilament length of about 250-350 meters is useful for placing on a spool and is provided according to one embodiment of the present disclosure.

A monofilament of the present disclosure may be characterized by its tensile modulus. A suitable Young's modulus is at least 3 MPa and up to 4 GPa or more. The lower limit is suitable for manufacturing parts having a higher elasticity and compliance, which is desired for many interfaces and tissue contacting structures. Higher modulus materials are selected for structural performance in high strength applications.

A monofilament of the present disclosure may be characterized by its crystallinity. A variety of total material crystallinity may be useful in various products, with low crystallinity materials typically associated with softer, higher compliance materials such as elastomers. These materials may exhibit a total crystallinity of <5%. Highly crystalline materials, such as PLLA or PEEK, may be useful in creation of rigid support structures where structural and mechanical strength is critical.

Another useful characterization of crystallinity is related to the presence of crystalline orientation along the fiber axis. Most typically, structural and textile monofilaments are used as an oriented yarn to maximize tensile strength, which is an important consideration for the design and utility of a particular monofilament. Orientation is formed after monofilament extrusion through a series of heating and pulling processes to align crystallites along the filament axis (also referred to as "drawing"), thereby increasing the strength and stiffness of the fiber in that direction, while having a concomitant effect of reducing mechanical properties in the transverse filament direction. In one embodiment, the monofilaments of the present disclosure may be characterized as being "not drawn" or "undrawn" in that they have not gone through a drawing process and therefore do not have the enhanced crystallinity which is created by a drawing process. There are several techniques to measure crystalline orientation, such as wide-angle X-ray diffraction, birefringence, linear dichroism, and in a technique specifically useful in fibers, the acoustic velocity, among others.

Acoustic velocity correlates the degree of drawing with relative speed of sound through the filament, reported as an orientation factor (OF). OF is reported in various ways. OF may be measured on a "0" to "1" scale, with "0" indicating no orientation and "1" indicating total crystalline orientation. Sometimes OF is reported as a percentage, i.e., from 0 to 100%, rather than from 0 to 1. In some instances, OF is reported as a multiple of an unoriented sample, e.g., 1.5 times the velocity of an unoriented control. However, in general, OF is a measure of the degree of molecular orientation or alignment of the polymer chains in a fiber or filament, where a higher number or higher percentage reflects a higher degree of alignment.

In many textile filaments, orientation factor can and desirably does exceed 0.75, 0.85, 0.90, and in some cases 0.95. Conversely, monofilaments used in additive manufacturing processes according to the present disclosure do not have the same tensile requirements and instead benefit from mechanical isotropy, along with a typically lower energy typically required to melt unoriented filaments. In the monofilaments of the present disclosure there may be some low degree of orientation as a result of the extrusion process, but since the monofilament is undrawn, the orientation factor of the monofilament is relatively low, e.g., less than 0.50, 0.40, 0.30, 0.20 or 0.10.

A relatively low OF is advantageous for filaments of the present disclosure suitable for a melt extrusion process such as FFF because lower orientation generally means less crystallinity, and that in turn means that less heat is needed to convert the monofilament into a liquid state, and that the heat which is applied to the monofilament can more quickly and efficiently convert a solid filament into a liquid state suitable for 3D printing. Accordingly, in one embodiment, the monofilament of the present disclosure has an orientation factor of less than 50%, while in another embodiment the monofilament has an orientation factor of less than 40%, and in another embodiment the monofilament has an orientation factor of less than 30%, while in yet another embodiment the monofilament has an orientation factor of less than 20%, and in still another embodiment the monofilament has an orientation factor of less than 10%. In each of these embodiments the monofilament may be further characterized as being an undrawn monofilament.

The monofilaments of the present disclosure may be characterized by their flexibility. A monofilament should not be so rigid (inflexible) that it breaks or fractures when it is wound around a spool. Conversely, the monofilament should not be so flexible that it will not move forward when a trailing portion of monofilament is pushed forward. In other words, when a length of monofilament is laid flat and in a straight line on a surface, and the proximal end of the monofilament is pushed in the direction of the distal end of the monofilament, the distal end of the monofilament should move forward the same distance as the proximal end is pushed forward. If the solid monofilament is too flexible it will not have the strength to push molten monofilament out of the heating chamber.

As a measure of the ability of a monofilament to push itself through a printer, a column buckling test may be performed, where this test measures the buckling resistance, also sometimes referred to as the buckling strength, of the monofilament in response to axial compression.

In a buckling test performed on a filamentous material, the material is placed in a vertical direction and clamped above and below the region of the filament that will be tested for buckling strength. A monofilament of the present disclosure may be held in place using two lengths of Bowden tube that run along and share a single longitudinal axis, where there is a 1 cm gap between an end of one Bowden tube and an end of another Bowden tube. A length of monofilament is placed within the two Bowden tubes, providing an interstitial monofilament, such that 1 cm of interstitial monofilament which lies between the two tubes is unsupported and exposed to ambient conditions. A Bowden tube is found on many FFF printing devices, and is a cylinder having an inner diameter of about 2.0 mm, where the monofilament having a width of about 1.75 mm needs to travel through the Bowden tube during the printing process. A mechanical test frame may be employed to move the two pieces of Bowden tubing closer together to thereby observe the effect of axial compression on the interstitial filament, while capturing load and displacement information during the test.

During the buckling test performed on various monofilaments, the resistance (load) increases in the fiber direction until a peak, at which point the buckling is so significant that the monofilament bends and behaves somewhat like a hinge, at which point the load begins to decrease. This transition from resistance to buckling typically occurs within the first 5 mm of axial compression. After this peak resistance is reached, it is easier for the filament to kink/bend rather than push against the applied compressive force.

Using the column buckling test, a study was performed using monofilaments with good printability in a 3D printing process, as well as sample materials that either printed poorly or cannot be printed with existing printers that employ a Bowden tube or operate as direct drive printers. This test identified a preferred minimum load correlating with a "printable" monofilament, where that value is at least 1 Newton. Monofilaments which exhibit little or no resistance to the moving together of the two ends of the Bowden tubes, i.e., measuring less than about 1 Newton in this column buckling test, had trouble being utilized in a printer using a Bowden tube as well as direct drive printers. This failure to adequately perform was due to low filament stiffness resulting in column buckling and filament misfeeds.

Accordingly, in one embodiment, the monofilament of the present disclosure exhibits at least 1 Newton of resistance when tested by a column buckling test. The monofilaments of the present disclosure may be characterized as having a buckling strength of at least 1 Newton. In another embodiment, the monofilament of the present disclosure exhibits at least 1 Newton of resistance when forces are applied along the longitudinal axis of a 1 cm length of the monofilament. In one embodiment, a 1 cm length of monofilament of the present disclosure, having a width or diameter of 1.5-3.0 mm, e.g., 1.75±0.05 mm, exhibits at least 1 Newton of resistance when tested by this column buckling test. In another embodiment, a 1 cm length monofilament of the present disclosure, having a width or diameter of 1.5-3.0 mm, e.g., 1.75±0.05 mm, exhibits at least 1 Newton of resistance when forces are applied along the longitudinal axis of a 3 cm or longer length of the monofilament, where the 1 cm length is unconstrained and there is at least 1 cm of monofilament on either end of the unconstrained 1 cm of monofilament, where the unconstrained 1 cm of monofilament resists compression along its longitudinal axis.

The present disclosure provides articles that may be sold in commerce and which provide the purchaser with convenient access to compositions usefully employed in additive manufacturing processes. These articles may also be referred to as assemblies.

In one embodiment, the monofilament of the present disclosure is wound around a spool. The spool may be of the type that includes a core that supports the monofilament, and two flanges that together function to retain the monofilament on the core. As mentioned herein, the monofilaments of the present disclosure may be cut into lengths that provide about 1 kg of monofilaments, where the present disclosure provides a spool containing this amount of monofilament. In other embodiments, the spool contains any of the other cut amounts of monofilament as discussed herein.

In one embodiment, the monofilament of the present disclosure is packaged and stored in a non-degradative environment. This is particularly important for monofilament that contains components that are susceptible to air- or moisture-induced degradation. Such monofilament includes bioabsorbable monofilament, i.e., monofilament made from a bioabsorbable material, which are particularly susceptive to moisture-induced degradation. Whether or not the monofilament is bioabsorbable, it benefits from being stored in an inert atmosphere. Thus, the non-degradative environment may have one or both of controlled moisture content and controlled oxygen content. In one embodiment the storage conditions include a dry environment which has a controlled moisture content, where in various embodiments the moisture content is controlled to be less than 1,000 ppm water, or less than 800 ppm water, or less than 600 ppm water, or less than 400 ppm water. The inert environment may be achieved by replacing ambient air with a nitrogen-enriched atmosphere. As another option, the inert environment may be achieved by placing the monofilament into an oxygen-impermeable package, and then sealing the package under reduced pressure. This approach also reduces the amount of moisture to which the monofilament would otherwise be exposed to during storage. Optionally, a desiccant such a packet of silica may be placed inside the packaging along with the monofilament.

In one embodiment, the present disclosure provides a packaged monofilament. The packaged monofilament is wound around a spool, and the spool with the monofilament is placed inside a foil pouch. The foil pouch is sealed under reduced pressure, or after replacing the ambient atmosphere with an inert atmosphere (e.g., nitrogen or dry air). Thus, the present disclosure provides a hermetically sealed package, such as a foil pouch, which contains monofilament wound around a spool, the foil pouch having reduced amount of moisture and/or oxygen relative to ambient conditions. Optionally, the pouch contains a single spool. Optionally, there is about 1 kg of a single length of monofilament wound around the single spool.

In other embodiments, the present disclosure provides methods of forming a composition as disclosed herein in a monofilament form, and forming an assembly from a monofilament as disclosed herein. The method of forming a monofilament form of a composition as disclosed herein comprises combining a solvent soluble component and a component that is not soluble in the solvent, melting the composition to provide molten composition, extruding the molten composition into an undrawn monofilament form having a diameter of 1-5 mm, e.g., 1.75±0.05 mm, and then optionally maintaining the undrawn monofilament in an undrawn form and/or sterilizing the undrawn monofilament. The method of forming an assembly from a monofilament as disclosed herein comprises providing a composition comprising a solvent soluble component and a component that is not soluble in the solvent, melting the composition to provide molten composition, extruding the molten composition into an undrawn monofilament form having a diameter of 1-5 mm, e.g., 1.75±0.05 mm, sterilizing the undrawn monofilament, wrapping the undrawn monofilament around a spool, and packaging the spool and monofilament in an air-tight container, and optionally placing desiccant into the container.

Thus, in one embodiment the present disclosure provides a method of forming a composition in a monofilament form, where the method includes: combining the additive and the polymer phase to form a composition, or alternatively combining a soluble component and an insoluble component, each as described herein, to form a composition; heating the composition to form a molten composition; and extruding the molten composition to form an undrawn monofilament. The undrawn monofilament may then be used in an additive manufacturing process as described herein. Optionally, the undrawn monofilament may be sterilized to facilitate its use in forming parts for medical applications. Optionally, the undrawn monofilament may be packaged for commercial sale. For example, the undrawn monofilament may be wound around a spool as described herein, and then placed into a package for storage until the monofilament is ready for use. The package may be air-tight so that the monofilament is not exposed to moisture or oxidative conditions from the atmosphere. The package may be, e.g., a foil pouch, in which case packaging entails placing the monofilament into the foil pouch. The monofilament may have any of the properties as described herein, e.g., composition, diameter, length, color, orientation factor, buckling strength, etc. For instance, the monofilament may be formed from a composition comprising a water-soluble component such as PEG (polyethyleneglycol, the additive) and a bioabsorbable polymer phase such as PDO that is essentially insoluble in water during the time that the additive dissolves in water after forming a part therefrom.

Also, in one embodiment, the present disclosure provides a method of forming an assembly, where the method includes: providing a composition comprising additive and polymer phase as described herein, to form a composition, or alternatively providing a composition comprising a soluble component and an insoluble component, each as described herein, the composition being provided in a molten form; extruding the molten form of the composition to form an undrawn monofilament; winding the undrawn monofilament onto a spool; and packaging the spool with monofilament wound thereon in, e.g., a foil pouch. The package may be air-right so that the monofilament is not exposed to moisture or oxidative conditions from the ambient atmosphere. The package may be, e.g., a foil pouch, in which case packaging entails placing the monofilament into the foil pouch. The monofilament may have any of the properties as described herein, e.g., composition, diameter, length, color, orientation factor, buckling strength, etc. For instance, the monofilament may be cut into a length of less than 400 meters when it is placed on a spool. As another example, the monofilament may be formed from a composition comprising a water-soluble component such as PEG (polyethyleneglycol, the additive) and a bioabsorbable polymer phase such as PDO that is essentially insoluble in water during the time that the additive dissolves in water after forming a part therefrom.

The present disclosure provides methods of additive manufacturing that employ the compositions and/or monofilaments and/or assemblies as disclosed herein.

In one embodiment, the present disclosure provides a method of additive manufacturing, the method comprising: a) melting a solid composition to provide a molten composition, the molten composition comprising an additive phase and a polymer phase as described herein; b) performing additive manufacturing to form an article from the molten composition; and c) contacting the article with a solvent, where the additive phase is soluble in the solvent, under conditions which at least partially dissolves the additive phase but not the polymer phase, to form a porous or microporous form of the article.

The terms porous and microporosity as used herein refer to the open spaces produced in a printed part due to the dissolution of the soluble component when the part is exposed to a solvent in which the soluble phase is soluble. When the soluble phase is completely removed from the printed part, the pores will be present in the insoluble component. The porosity may take the form of open or closed cells. The porosity may take a fibrous form, also referred to as a microfibrous form, in which channels are present in the article. The pores may alternatively be referred to as cavities or void spaces.

In the method of additive manufacturing, the solid composition may be a monofilament such as described herein. As an alternative, the solid phase may be a powder or granules as described herein. Rather than being described as containing an additive phase and a polymer phase, the composition may be described as containing a solvent-soluble phase or component, and a solvent insoluble phase or component, where the solvent insoluble component is an organic polymer or a blend of organic polymers. The additive (insoluble) component may be, as two examples, an organic polymer or a blend of organic polymers as discussed herein, or may be a salt as also discussed herein.

In the method of additive manufacturing, the solid composition is melted to provide a molten composition, where the molten composition comprises the additive phase and the polymer phase. In order to provide a molten composition, the solid composition is heated to a temperature sufficient to melt the composition. As used herein, melting the composition refers to heating the composition to a sufficiently elevated temperature that the composition will flow. For example, the composition may be heated to a temperature of 50-450° C. as needed to melt the composition into a state that allows the composition to flow. The composition may be heated to a temperature which exceeds the temperature necessary to melt the composition. Note that it is not necessary that every component of the composition is a liquid at the elevated temperature. However, the composition as a whole should flow at an elevated temperate (i.e., a temperature above room temperature, e.g., above 50° C.), and thus has a liquid character at an elevated temperature.

When the composition is in the form of a monofilament, the entirety of the monofilament will not be placed into a molten state at one time. Rather, an end of the monofilament will be placed into a heated environment and melted to form a molten composition. For example, during the additive manufacturing process, the end of the monofilament may be threaded into a hollow metal cylinder, e.g., the print head, where the walls of the cylinder are heated to a temperature that causes the filament inside the cylinder to melt. The adjacent portion of the monofilament, i.e., the adjacent portion which has not yet converted to a molten form, may be pushed into the hollow cylinder, causing the molten form of the composition already in the cylinder to exit the cylinder and deposit into a space where the part is formed. The monofilaments of the present disclosure have sufficient strength that they can be pushed into the hollow cylinder or similar heating chamber. Unlike many types of monofilaments, it is not necessary that the monofilaments of the present disclosure be capable of being pulled or drawn. The monofilaments of the present disclosure are intended for additive manufacturing processes wherein the monofilament is pushed or otherwise forced into a hot chamber where it undergoes a phase change from a solid to a molten state. The monofilament should be capable of being pushed into this heating chamber, and also be capable of pushing molten composition out of the chamber.

In the method of additive manufacturing, the molten composition is converted to a printed part, which may also be named a printed article or simply an article. This step may be achieved by a fused filament fabrication method, which is known in the art, and sometimes referred to as FFF 3D printing. This step may be achieved by a fused deposition modeling method, which is known in the art, and sometimes referring to as FDM 3D printing.

The present disclosure provides a process of additive manufacturing, e.g., 3D printing. Additive manufacturing by Fused Filament Fabrication (FFF) is a polymer melt-facilitated process in which a polymeric filament is fed into a heated nozzle, with the nozzle transferring energy to the filament enough to allow material to deform and flow. This process may result in a complete melting of the polymer, but also it could result in a softening of the material to a level in which it can be forced out of the nozzle. The key process parameter is that the material is able to be transferred through the nozzle and deform during transfer into an essentially flattened form as the nozzle moves over a surface.

Preferably, the filament has diameter of about 1.75-3.0 mm and the nozzle has a diameter of about 0.35-0.40 mm. The filament is typically applied at a layer height of between 0.1 mm and 0.3 mm. Depending on the application and required part mechanics and accuracy, alternative diameters for the filament and nozzle may be used, with smaller diameters leading to higher precision parts at the expense of increased manufacturing cycle times. In one embodiment, the present disclosure provides compositions of continuous and distributed phases as described herein, in filament form, e.g., a spool of filament suitable for use in a FFF process.

Compositions including a continuous and distributed phase can be processed in FFF as long as the softened or melted composition can flow through the nozzle. For compositions including a distributed phase that is solid at the processing temperature, the distributed phase dimensions must be less than the nozzle diameter in at least one direction. For example, in FFF systems using a nozzle diameter of 0.35 mm, particulate that is essentially spherical must have a diameter less than 0.35 mm, and more preferably less than 0.30 mm to allow for additional continuous phase material to flow with the distributed phase to maintain continuity of the printed article. Additionally, the layer thickness target should also be considered when assessing the dimensions of a solid distributed phase. For target layer thicknesses of 0.20 mm, the solid distributed phase should have at least one dimension less than 0.20 mm, and preferably less than 0.15 mm to allow for additional continuous phase material to create a continuous layer around at least the majority of the particulate in the printed article. For printed layer thicknesses of less than 0.20 mm, a concomitant reduction in the solid dispersed phase is required.

In some cases where the solid dispersed phase is an elongated structure, such as a chopped fiber, the FFF process typically results in alignment of the distributed phase along the printing direction. This is particularly true with longer aspect ratio filaments or with distributed phase diameters of more than 10% of the layer thickness.

Additive manufacturing through fused filament fabrication (FFF) is enabled through the modulation of a variety of material, process, and environmental parameters. The appropriateness of these parameters is primarily defined through the fiber that is used and secondarily by the part being manufactured. Additive manufacturing using FFF techniques can create macroporous structures through the implementation of infill patterns. This type of feature is imbedded within software and creates geometrically regular pore patterns such as triangles, squares, and hexagons. These software generated infill patterns are typically 2-dimensional in nature and create a single pore pattern that transverses the build direction of the part. Other software can generate more complex 3-dimensional porosity based on geometric structures or irregular patterns. Porosity created in this way physically translates to a printed part through the deposition of FFF filament and is dependent on the accuracy and layer thickness of the printer, which is on the order of 0.1 mm or more. FFF parts can include macroporous pore sizes of about 0.5 mm or larger. The present disclosure utilizes two phase material to form a part, where the part may or may not be fabricated to include pores.

The present disclosure forms parts from a two-phase material utilizing an additive manufacturing technique such as FFF. In one embodiment, the present disclosure imparts pores to an otherwise non-porous part, i.e., the part as fabricated does not contain pores, however pores are added to the after-formed part by removal of additive phase from the part. Alternatively, the part is fabricated to contain pores, and the present disclosure imparts additional, typically smaller, pores to the finished fabricated part.

In additive manufacturing, the use of printing temperature, feed rate, and environmental conditions can influence the quality of a manufactured part. For thermoplastic resins, temperature is controlled to create a fluid which can be extruded through a nozzle. FFF printing utilizes a single heating zone with a set temperature above the melting point of the filament, and an appropriate temperature range may be determined for each printing material. At the lower end of the temperature range, the fluid has a higher viscosity and may be useful to create parts with higher accuracy but the adhesion between deposited filaments may be weaker. At higher temperatures, the fluid may allow for improved adhesion but part accuracy may be impacted due to the increased ability for molten plastic to flow after deposition and during cooling.

Feed rate is a secondary control parameter which is influenced by the melt viscosity of the polymer as well as the stiffness of the solid monofilament input. Pressure is generated in the polymer melt through a drive mechanism which drives the filament through the FFF system, which is identified by the "feed rate." This simple mechanism pushes the monofilament into a heated segment of the printer, wherein the monofilament is melted, and extrusion pressure is generated through the resistance of the molten material to flowing through a nozzle. An increase in feed rate directly increases the extrusion pressure, and pressures above a certain monofilament-specific level results in filament buckling and/or drive mechanism errors.

To support 3D printing by Fused Filament Fabrication (FFF), the filament must meet certain minimum requirements. A set of drive gears is used to convey the filament at a precise rate through the nozzle, and this drive force creates pressure which forces the polymer to flow from the printer nozzle. There are two types of FFF printer based on drive location. A "direct drive" printer places the drive mechanism immediately above the printing nozzle which is moved with the nozzle to form the printed article. The moving mass is heavier in this case and printing speeds may be slower, but there is less distance between the drive mechanism and nozzle which benefits softer materials. In contrast, a "Bowden tube" printer places the drive mechanism remotely and connects the two with a flexible tube that is slightly larger in diameter than the printing filament. There is less mass to move with the print head but the distance between drive and nozzle can lead to kinking with softer filaments.

To facilitate the drive mechanism, filament may exhibit a minimum column stiffness to allow for accurate feeding through the printer. Column stiffness, from Euler's column stiffness equations, is increased with increasing Young's Modulus as well as with filament diameter, and is reduced as the length is increased. Furthermore, the deposition rate of a composition is directly linked to the feed rate of the filament through the drive mechanism, as this is the only mechanism for metering material through the printer system. Regularity of feed is dependent on consistent filament diameter, both to maintain a consistent pressure through the printing nozzle and to maintain a specified rate of deposition.

Standard industrial printers utilize filament diameters of about 1.75-3.0 mm, with target diameter tolerance of ±0.05 mm. Alternative filament diameters have been used, however, with utility based on the ability for the material to feed into the system (adequate stiffness). For bioabsorbable polymers, smaller filament sizes may reduce the duration of time for which the polymer is melted, thereby reducing risk of polymer degradation, which may be useful when targeting high precision printed articles with fine features.

Standard FFF filament has a typically smooth surface, but this is not necessary to facilitate the printing process. In certain cases, it may be beneficial for printing filament to have a rough or textured surface to assist the drive mechanism to feed material, particularly those that are much harder or softer than normal. A roughened or textured surface may also be a cosmetic effect of the filament preparation process, and reflect the inclusion of secondary phases or components. It is still critical, however, for filament to maintain an average diameter to support consistent feeding through the FFF printing system.

Filament printing is typically performed in room temperature conditions, so the filament should preferably meet the stiffness requirements at the drive mechanism through to the point of heating at or near the nozzle. Filament is typically introduced to the drive mechanism at a temperature between 20-25° C. In the case of "Bowden tube" FFF printers, there may be a transition from room temperature to elevated temperature up to about 100° C. as the material approaches the feed nozzle, depending on the material requirements to support printing.

The present disclosure provides compositions, optionally in filament or granulated form, which may be used in additive manufacturing. Particularly when the composition includes a bioabsorbable component, special environmental controls may be implemented during the printing process. For example, humidity may be kept at low levels so as not to prematurely degrade the bioabsorbable polymer and part made therefrom. Environmental temperature also influences parts during the printing process through controlling the rate of cooling and crystallization, where warmer temperatures results in slower cooling and slower crystallization rate. At lower temperatures, parts may cool quickly resulting in warping and poor layer adhesion. For example, FFF using PLA may not be possible at 20° C. due to rapid crystallization during cooling, but increasing the environmental temperature to 30° C. results in high quality printed parts. In general, the environmental temperature should be set such that full crystallization of the part doesn't occur during the printing cycle. Similarly, the printing bed should be set at a temperature close to the glass transition temperature of the polymer to allow for good part adhesion to the build surface, stabilizing the part during the build cycle.

In the method of additive manufacturing, the printed part is contacted with a solvent, where the additive phase is soluble in the solvent. This contact achieves a complete or partial extraction of the additive from the printed part.

A post-formation process of the present disclosure is exposing the printed part to a solvent that dissolves, extracts or causes degradation to the additive phase while having little or no impact on the materials that form the polymer phase. By this process, the printed part acquires a microporous structure that is advantageous for some medical implants. In one embodiment, the additive phase is the distributed phase of the composition, and the polymer phase is the continuous phase of the composition. In another embodiment, the additive phase is the continuous phase of the composition and the polymer phase is the distributed phase of the composition.

In various embodiments, at least 50 wt %, or at least 60 wt %, or at least 70 wt %, or at least 80 wt %, or at least 90 wt % of the additive phase is extracted from the printed part. In one embodiment, the solvent is water, so that the soluble component of the part is soluble in water while the insoluble component of the printed part is not soluble in water. In one embodiment, the solvent includes water, as well as optionally including one or more other solvents that are miscible with water, e.g., methanol or dimethyl sulfoxide (DMSO) or acetone.

In one embodiment, the extraction is performed at room temperature, i.e., about 23° C. However, in one embodiment the extraction takes place at an elevated temperature. For example, the extraction may take place at a temperature of about 25-50° C. In embodiments, the extraction takes place at a temperature within the range of 25-30° C., or 30-35° C., or 35-40° C., or 45-50° C., or 50-55° C., or 60-65° C., or 65-70° C., or 70-75° C. The extraction occurs at a temperature which is less than the melting temperature of the composition, e.g., at least 10° C., or at least 15° C., or at least 20° C., or at least 25° C., or at least 30° C. below the melting temperature of the composition.

Optionally, the entirety of the printed part is contacted with the solvent. However, in one embodiment, only a portion, or multiple distinct portions, of the printed part is contacted with the solvent. For instance, the printed part may be a biodegradable stent, where the distal end of the stent is exposed to solvent to create porosity or microporosity at the distal end of the stent, but the proximal end of the stent is not exposed to the solvent and thus does not have the same porosity or microporosity as does the distal end. With this approach, the distal end of the stent may be expected to degrade more quickly in vivo than the proximal end of the stent. The process of the present invention thus provide a mechanism to impart selective and controlled in vivo degradation to a 3D printed biodegradable medical implant.

The printed part, post-extraction, will have a density which is less than the density of the printed part, pre-extraction. This is because the overall volume of the part remains constant or essentially constant during the extraction process, however the extraction of the soluble component reduces the total mass of the printed part. In one embodiment, the extraction process achieves at least a 5% reduction in the density of the printed part, while in other embodiments the extraction process achieves at least a 10%, or at least a 15%, or at least a 20% reduction in the density of the printed part.

Likewise, the printed part, post-extraction, will have a density which is less than the density of the composition from which the part was printed. This is because the printed part will have a volume approximately equal to the volume of the composition from which the part was printed, however the part will have lost some or all of the soluble component that is present in the printing composition. In one embodiment the printing composition has a density and the article has a density, and the article has a density of less than 85% of the density of the composition. In other embodiments, the article has a density of less than 80%, or less than 75%, or less than 70%, or less than 65%, or less than 60%, or less than 50% of the density of the printed part.

The extraction process will dissolve some or all of the soluble component, also referred to herein as the additive, away from the printed part. The post-extraction printed part will have cavities on its surface that are formed by the dissolution of the soluble phase. The cavities are referred to herein as pores or micropores, and the printed part is describing as having porosity or microporosity.

The microporosity is created by removal of additive phase from the printed part. That microporosity may be in the form of closed cells, i.e., pores that do not connect with one another. However, if a high concentration of additive phase is present in the composition of the present disclosure, then those regions of additive phase may, in some instances, touch one another, thereby creating larger pores after removal of the additive phase. Accordingly, in some embodiments, the printed parts may have a somewhat interconnected porous structure.

In looking at the surface of the post-extraction printed part, e.g., by SEM, the cavities will be visible. The size of the cavities may be described, herein in one embodiment the cavities have a maximum cross section of between 0.5 mm and 50 mm. In another embodiment, cavities will have a maximum cross section of 20-400 microns, as viewed by SEM. The cavities will not necessarily be circular in appearance, but may be irregularly shaped. For example, the cross section of 0.5-50 mm refers to the maximum distance across the cavity, and is not necessarily a strict diameter.

The cavities may not be of a circular or generally irregular shape, but may take the form of a series of channels that each run along the longitudinal axis of the printed thread. The presence of channels on the surface of a printed part allows for solvent to flow in and along the channels.

The removal of the additive phase in the presence of a suitable solvent may be assisted by applying sonication during the removal process. For example, the printed part may be placed in an ultrasonic bath along with a suitable solvent that dissolves the additive phase but does not dissolve the polymer phase. In this way, a printed part having microporosity can be produced. In one embodiment of the method of additive manufacturing, the printed part is contacted with a solvent in the presence of sonication, where the additive phase is soluble in the solvent. This contact achieves a complete or partial extraction of the additive from the printed part.

After being exposed to the solvent, the remaining part may be dried to achieve a solvent-free condition. For example, the remaining part may be placed under a reduced pressure so that the remaining solvent evaporates. The method of additive manufacturing of the present disclosure optionally includes a drying operation to remove excess solvent from the printed extracted part. In one embodiment, the drying operation removes residual solvent from the article such that the residual solvent is less than one weight percent based on the weight of the porous form of the article.

After being exposed to the solvent, the remaining part may be exposed to sterilizing conditions. Thus, the additive manufacturing method of the present disclosure optionally includes a sterilizing operation to sterilize the post-extraction article by a method selected from treatment with ethylene oxide, gamma, e-beam, dry heat and steam processes. This operation kills or removes any live bacteria from the printed part and thus allows the printed part to be used in cases where a sterile environment is important, e.g., during surgical implantation of the printed part.

Printed parts can be further enhanced via post-formation processing. Exemplary post-formation processing includes annealing, solvent smoothing, sanding, grinding, and cutting to change final shape.

The present disclosure also provides a method comprising:
a) providing a composition comprising an additive in a polymer phase, which may also be referred to as a composition comprising a solvent soluble component (the additive) and a solvent insoluble component (the polymer phase) as described herein, which may be in the form of granules;
b) extruding the composition into a fiber;
c) melting the fiber to provide a molten composition;
d) performing additive manufacturing to form an article (which may also be referred to as a part, or a printed part) from the molten composition;
e) contacting the article with a solvent, where the additive is soluble in the solvent, under conditions which at least partially dissolves the additive but not the polymer phase, to form a porous form of the article; and
f) removing solvent from the porous form of the article such that the residual solvent still associated with the article is less than one weight percent based on the weight of the porous form of the article.

The present disclosure provides parts printed by additive manufacturing processes and treated by a post-printing treatment process as disclosed herein.

In one embodiment, the present disclosure provides articles which contain microporosity, particularly articles that are made by additive manufacturing and related post-treatment. This is notable particularly in medical applications, where the potential to create customized, patient specific implants with increased and precision designs may support creation of advanced scaffolds, artificial partial or complete organs, targeted pharmaceutical delivery, and many other applications. In one embodiment, the microporosity take the form of a series of channels that each run along the longitudinal axis of the printed thread.

Filaments that contain extractable materials can be useful for a variety of applications, including tissue engineering, pharmaceutical delivery, selective filtration, and as a precursor for additional surface modification. By incorporating a secondary material which is extractable, surface texture and porosity may be generated that would not be possible through a typical printing process. This technique may be enabled through the use of a solvent, wherein the solvent dissolves at least one component of the printed part while the at least one other component is essentially insoluble. It is desirable for the components to create distinct phases, and preferably to create phases that are sufficiently interconnected to allow for selective extraction.

As just one example, in one embodiment the present disclosure provides a porous structure that may be created as described herein from degradable polymer, e.g., a degradable polymer that is formed from lactide, such that greater than 70 wt %, or greater than 75 wt %, or greater than 80 wt %, or greater than 85 wt %, or greater than 90 wt % of the degradable polymer is formed from lactide. The porous structure can be printed by fused deposition modeling (i.e., be FDM printed) in such a manner that the printed structure has more than 20% void space and up to 80% void space, e.g., has at least 20%, or at least 30%, or at least 40%, or at least 50%, or at least 60%, or at least 70%, and up to 30%, or up to 40%, or up to 50%, or up to 60%, or up to 70%, or up to 80% void space. The structure or article can be printed such that there are interconnected pores within the structure. In one embodiment, there is open porosity with pore sizes ranging between 50 µm and 500 µm, e.g., the pore size is at least 50 µm, or at least 100 µm, or at least 200 µm, or at least 300 µm, or at least 400 µm and may be as great as 500 µm, or 400 µm, or 300 µm, or as great as 200 µm, or as great as 150 µm, or as great as 100 µm.

The surface of the printed structure may optionally contain reactive functional groups to increase hydrophilicity or to improve surface compatibility or bonding with a second material. For example, the surface of the structure may optionally be modified by using processes such as plasma treatment, base or acid surface treatment or irradiation (UV, gamma, e-beam). The treated surface may be further functionalized by grafting a variety of materials such as polyethylene glycol (PEG), poly(vinyl alcohol) [PVA], chitosan, albumin, hyaluronic acid, heparin, growth factors onto the surface of the scaffold.

The porous structure may optionally be loaded with a hydrogel matrix comprising growth factors, MSCs, or other cell types, where the hydrogel may optionally be selected from a group that may closely approximate the printed scaffold, interact with the printed scaffold, ionically bond with the printed scaffold, or covalently bond with the printed scaffold. The interaction between the hydrogel matrix and the printed scaffold may result in improved cellular approximation with the printed scaffold and increased stability of the hydrogel within the printed scaffold matrix. The hydrogel matrix may comprise, e.g., hyaluronic acid, albumin, chitosan, polyethylene glycol (PEG). Following incorporation of the hydrogel into the porous scaffold, the porous structure functions to create and stabilize a desirable shape and protect the hydrogel scaffold during early cell proliferation. In one embodiment, the structure/hydrogel/cell composite scaffold approximates the mechanical properties of the desired tissue construct. In one embodiment, as the cellular composite matures, the printed porous structure, which has been printed using one or more degradable polymers, and hydrogel may degrade leaving behind only the cellular components and the extracellular matrix produced by the cells. Optionally, when the scaffold is printed from one or more non-degradable polymers, all or a portion of the structure may remain to provide a permanent support.

This provides an exemplary application of the compositions and articles of the present disclosure.

For many applications including medical applications, it would be useful to create discrete phases with varying functionality at a smaller scale than equipment-only control allows. The present approach, as described herein, utilizes a composition comprising an additive in a polymer phase, e.g., a distributed phase comprising the additive which is dispersed in a continuous polymer phase, or if sufficient additive is present in the composition, the additive may constitute the continuous phase and the polymer phase may provide a distributed phase. The composition may be in a form particularly suitable for an additive manufacturing process, e.g., in the form of granules that constitute a powder, or in the form of a filament or fiber. This form is then processed and the subsequently printed part is used to generate tailored phase-modulated structures.

When the composition is in the form of a powder or granules, it may be used in a direct screw extrusion 3D printing process to form an article or part of interest. In such a process, a mounted mini-extruder is placed in combination with a 3d printer, which would utilize heat to melt the powder or granules material into a fluidized bed. As an alternative, a direct plunger extraction 3D printing process may be used to form an article of part of interest. In such a process, a mounted heated cylinder uses heat and pressure to create a fluidized bed and force it out of the nozzle. This type of printing looks like a heated syringe is being used to create the molten composition and expel it into the bed of the printer to form the article of interest. When the composition is in a monofilament form, FFF 3D printing process may be used to form an article or part of interest.

For medical applications, it would be useful to create discrete phases with varying functionality at a smaller scale than equipment-only control allows. An approach to providing these discrete phases, as described fully herein, utilizes the composition and processing of a monofilament or powder, and post-treatment of the subsequent printed part to generate tailored phase-modulated structures.

The articles that are printed with the compositions disclosed herein may be useful in medical applications. For instance, after implantation, they may serve as a tissue scaffold, as described elsewhere herein. They may be used as topical devices, i.e., placed on the skin surface of a subject. They may be used in dermal applications. They may be used to fill a defect in tissue or bond. They may be used in trauma treatment. These are examples of where medical implants having microporosity are useful.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Exemplary embodiments of the disclosure include: a composition comprising an additive in a polymer phase, wherein: a) the additive is soluble in a solvent; b) the polymer phase comprises an organic polymer and is essentially insoluble in the solvent; c) the composition is a solid at temperatures below 25° C. and a viscous fluid with a Melt Flow Index of 2.5-30 g/10 min at a temperature above the melt temperature of the composition; and d) the composition has a weight percent of the additive based on the weight of the composition and a weight percent of the polymer phase based on the weight of the composition, where the sum of the weight percent of the additive and the weight percent of the polymer phase is greater than 90%. Another exemplary embodiment of the present disclosure is a composition comprising a distributed phase in a continuous phase, wherein the distributed phase is soluble in a solvent; the continuous phase comprises an organic polymer and is essentially insoluble in the solvent; the composition is a solid at temperatures below 25° C. and a viscous fluid with a Melt Flow Index of 2.5-30 g/10 min at a temperature above the melt temperature of the composition; and the composition has a weight percent of the distributed phase based on the weight of the composition and a weight percent of the continuous phase based on the weight of the composition, where the sum of the weight percent of the distributed phase and the weight percent of the continuous phase is greater than 90%.

Optionally, either of these compositions may be further characterized by one or more (e.g., two, or three, or four, etc.) of the following features: the solvent is or comprises water, the composition is in a form that can be used in an additive manufacturing process, e.g., in the form of a filament, or a filament wound around a spool, where the filament optionally has a diameter of about 0.5-5 mm, or about 1-5 mm, or about 1.5-5 mm, or about 2-5 mm, or about 2.5-5 mm, or about 0.5-4 mm, or about 1-4 mm, or about 1.5-4 mm, or the composition is in the form of granules; the weight percent of the distributed or additive phase in the composition is 1-60%, or 1-50%, or 1-40%, or 1-30%, or 1-20% or 5-60%, or 5-50%, or 5-40%, or 5-30%, or 5-20%, or 10-60%, or 10-50%, or 10-40%, or 10-30%, or 20-60%, or 20-50%, or 20-40%, or 30-60%, or 30-50%, where these percentage ranges are weight of the additive or distributed phase, divided by the total weight of the composition times 100; the distributed phase has an average particle size of about 20-400 microns, or about 20-300 microns, or about 20-100 microns, or about 40-400 microns, or about 40-300 microns, or about 40-200 microns, or about 60-400 microns, or 60-300 microns, or 60-200 microns, or 100-400 microns, or 100-300 microns, or 100-200 microns, where these micron values refer the average longest distance through a plurality of distributed phases; the additive or distributed phase comprises an inorganic salt, e.g., an inorganic salt comprising a cation and an anion, where the cation is selected from sodium, potassium and magnesium and the anion is selected from chloride, bromide, iodide, sulfate, phosphate, carbonate, bicarbonate; the additive or distributed phase comprises a water-soluble organic compound, e.g., a sugar or an organic carboxylic acid or a salt thereof; the polymer or continuous phase comprises a bioabsorbable polymer, e.g., a bioabsorbable polymer comprising segments selected from polyester, polyanhydride, poly(hydroxybutyrate), and polyether; the polymer or continuous phase comprises a non-bioabsorbable polymer, e.g., a non-bioabsorbable polymer selected from polyethylene, nylon, thermoplastic polyurethane, polypropylene, polyetheretherketone, polyaryletherketone and polyethylene terephthalate; the composition has little or no residual monomer, e.g., has residual monomer at a concentration of <2% by weight, or <1% by weight, or less than 0.5% by weight; the composition has little or no residual tin, e.g., a tin concentration of <200 ppm.; the composition has little or no non-tin heavy metals, e.g., a non-tin metal concentration of <50 ppm.

In other embodiments, the present disclosure provides a method of additive manufacturing, the method comprising: a) melting a solid composition to provide a molten composition, the molten composition comprising an additive phase and a polymer phase as described herein; b) performing additive manufacturing to form an article from the molten composition; and c) contacting the article with a solvent, where the additive phase is soluble in the solvent, under conditions which at least partially dissolves the additive phase but not the polymer phase, to form a porous or microporous form of the article.

The present disclosure provides the following numbered embodiments, which are exemplary and non-limiting of the embodiments provided by the present disclosure:

1. A composition comprising an additive in a polymer phase, wherein:
   a. the additive is soluble in a solvent;
   b. the polymer phase comprises an organic polymer and is essentially insoluble in the solvent;
   c. the composition is a solid at temperatures below 25° C. and a viscous fluid with a Melt Flow Index of 2.5-30 g/10 min at a temperature above 50° C.; and
   d. the composition has a weight percent of the additive based on the weight of the composition and a weight percent of the polymer phase based on the weight of the composition, where the sum of the weight percent of the additive and the weight percent of the polymer phase is greater than 90%.
2. The composition of embodiment 1 in a form of a monofilament.
3. The composition of embodiment 2 wherein the monofilament is an undrawn monofilament.
4. The composition of embodiment 2 wherein the monofilament has an orientation factor of less than 50%.
5. The composition of embodiment 2 wherein the monofilament has a diameter of 1-5 mm.
6. The composition of embodiment 5 wherein the monofilament has a diameter of 1.75±0.05 mm.
7. The composition of embodiment 6 wherein the monofilament has a column buckling resistance of at least 1 Newton.
8. The composition of embodiment 1 in a form of a powder or granule.
9. The composition of embodiment 1 wherein the additive comprises an inorganic salt.
10. The composition of embodiment 1 wherein the additive comprises a water-soluble organic compound.
11. The composition of embodiment 10 wherein the water-soluble organic compound is polyethylene glycol.
12. The composition of embodiment 1 wherein the polymer phase comprises a bioabsorbable polymer.
13. The composition of embodiment 12 wherein the polymer phase comprises a bioabsorbable polymer comprising segments selected from polyester, polyanhydride, poly(hydroxybutyrate) and polyether, where, in one example, the additive may be or may include polyalkylene glycol, e.g., polyethylene glycol (PEG) or polypropylene glycol (PPG) or copolymers of ethylene glycol and propylene glycol, while the polymer phase is a bioabsorbable polymer such as a polymer including polyester and/or polyanhydride segments, e.g., segments produced from glycolide (polyglycolide, PGA), lactide (polylactide, PLA), dioxanone (polydioxanone, PDO), trimethylene carbonate (polytrimethylene carbonate, TMC), caprolactone (polycaprolactone, PCL), hydroxyalkanoates such as hydroxybutyrate (polyhydroxyalkanoate, e.g., PHB), or mixtures thereof such as polylactide-co-glycolide (PLGA).
14. The composition of embodiment 1 wherein the polymer phase comprises a non-bioabsorbable polymer.
15. The composition of embodiment 14 wherein the polymer phase comprises a non-bioabsorbable polymer selected from polyethylene, nylon, thermoplastic polyurethane, polypropylene, polyetheretherketone, polyaryletherketone and polyethylene terephthalate, where, in one example, the additive is soluble in an organic solvent such as chloroform while the polymer phase is not soluble in the organic solvent, e.g., chloroform, and the additive is a polymer including polyester and/or polyanhydride segments, e.g., segments produced from glycolide (polyglycolide, PGA), lactide (polylactide, PLA), dioxanone (polydioxanone, PDO), trimethylene carbonate (polytrimethylene carbonate, TMC), caprolactone (polycaprolactone, PCL), hydroxyalkanoates such as hydroxybutyrate (polyhydroxyalkanoate, e.g., PHB), or mixtures thereof such as polylactide-co-glycolide (PLGA).
16. The composition of embodiment 1 wherein the weight percent of the additive in the composition is 1-60%.
17. The composition of embodiment 1 where the solvent is water, the additive is soluble in water and the polymer phase is insoluble in water.
18. An assembly comprising the monofilament of embodiment 2 and further comprising a spool, where the monofilament is wrapped around the spool.
19. The assembly of embodiment 18 wherein the monofilament on the spool is enclosed within an air-tight container.
20. A method of forming a composition of embodiment 2 comprising:
    a. combining the additive and the polymer phase to form a composition;
    b. heating the composition to form a molten composition;
    c. extruding the molten composition to form an undrawn monofilament; and
    d. sterilizing the undrawn monofilament.
21. A method of forming an assembly of embodiment 18 comprising:
    a. providing a composition according to embodiment 1 in a molten form;
    b. extruding the molten form of the composition to form an undrawn monofilament;
    c. winding the undrawn monofilament onto a spool; and
    d. packaging the spool with monofilament wound thereon.
22. A method of additive manufacturing, the method comprising:
    a. melting a solid composition to provide a molten composition, the molten composition comprising an additive and a polymer phase according to any of embodiments 1-17;
    b. performing additive manufacturing to form an article from the molten composition; and
    c. contacting the article with a solvent, where the additive is soluble in the solvent, under conditions which at least partially dissolves the additive but not the polymer phase, to form a porous form of the article.
23. The method of embodiment 22 wherein the solvent dissolves at least 50% of the additive.
24. The method of embodiment 22 wherein the solid composition is melted at a temperature of 50-450° C. to form the molten composition.
25. The method of embodiment 22 wherein the additive manufacturing method is fused filament fabrication (FFF).
26. The method of embodiment 22 wherein the porous form of the article comprises a plurality of channels that run along the surface of the article in a longitudinal direction compared to the longitudinal direction of a fibrous form of the molten composition created during the additive manufacturing process.

27. The method of embodiment 22 further comprising sterilizing the article by a method selected from treatment with ethylene oxide, gamma, e-beam, dry heat and steam processes.

28. The method of embodiment 22 further comprising removing solvent from the article such that any residual solvent is less than one weight percent based on the weight of the porous form of the article.

29. A method of additive manufacturing, the method comprising:
   a. providing a composition comprising an additive in a polymer phase according to any of embodiments 1-17;
   b. extruding the composition into a monofilament fiber;
   c. melting the monofilament fiber to provide a molten composition;
   d. performing additive manufacturing to form an article from the molten composition;
   e. contacting the article with a solvent, where the additive is soluble in the solvent, under conditions which at least partially dissolves the additive but not the polymer phase, to form a porous form of the article; and
   f. removing solvent from the porous form of the article such that any residual solvent is less than one weight percent based on the weight of the porous form of the article.

The following Examples are offered by way of illustration and not by way of limitation.

EXAMPLES

Example 1

Microfibrous Article Made from Polydioxanone and PEG

Filaments suitable for additive manufacturing were prepared from polydioxanone (PDO) and polyethyleneglycol (PEG). The quantities of PDO and PEG present in each of the filament are set forth in Table 1. The selected amounts of PDO and PEG were placed in a jar. The PDO (Poly-Med, Anderson S.C., USA) had a molecular weight such that a dilute solution in hexafluoro-2-propanol (HFIP) had an inherent viscosity of 1.7 dL/g at a concentration of 0.1 mg polymer/mL solvent. The PEG had an average molecular weight of 20 kDa and was obtained from Dow duPont Chemical Co., Midland Mich., USA. A jar containing the two powders was shaken at room temperature to achieve a homogeneous appearance, requiring about 1 hour. The mixture was dried under reduced pressure.

The mixture was fed into a custom ¾" barrel diameter extruder equipped with a 0.584 cc/rev metering pump and extruded through a die. The resulting fiber was conveyed using a puller attached to the exit of the extruder and simultaneously the fiber was pulled through a water bath to form the monofilament fiber. These conditions resulting in a monofilament fiber having an average filament diameter of 1.75 mm. This process may be used to make filaments suitable for additive manufacturing, e.g., filaments having a diameter of 1.5-3.0 mm. Filament was collected on spools and stored in a dry, inert environment (nitrogen atmosphere) until time of use. This filament is referred to herein as a printing filament.

TABLE 1

| PDO (wt %) | PEG (wt %) | Filament Name |
|---|---|---|
| 100 | 0 | PDO 100 |
| 60 | 40 | PDO 60 |
| 50 | 50 | PDO 50 |

FDM printing was performed using a HYDRA 640 printer (Hyrel 3D, Atlanta, Ga.) with a modular direct drive print head equipped with a 1.0 mm nozzle, set to a 15 mm/s feed rate with nozzle temperature and bed temperature at 165° C. and 45° C., respectively. Each printing filament was used to print a disc-shaped article of two layers of printing filament. The disc consisted of a first series of parallel threads forming a first layer and a second series of parallel threads forming a second layer printed on top of the first layer, where the second series of parallel threads followed a longitudinal direction that was perpendicular to the longitudinal direction of the threads in the first series. This shape can be seen in FIG. 2. The printing filament had a melt temperature of about 110° C. and was printed at 165° C., so that when molten printing filament was printed to form the second layer, the first layer melted slighted and the first and second layers adhered to one another.

Figure 2:
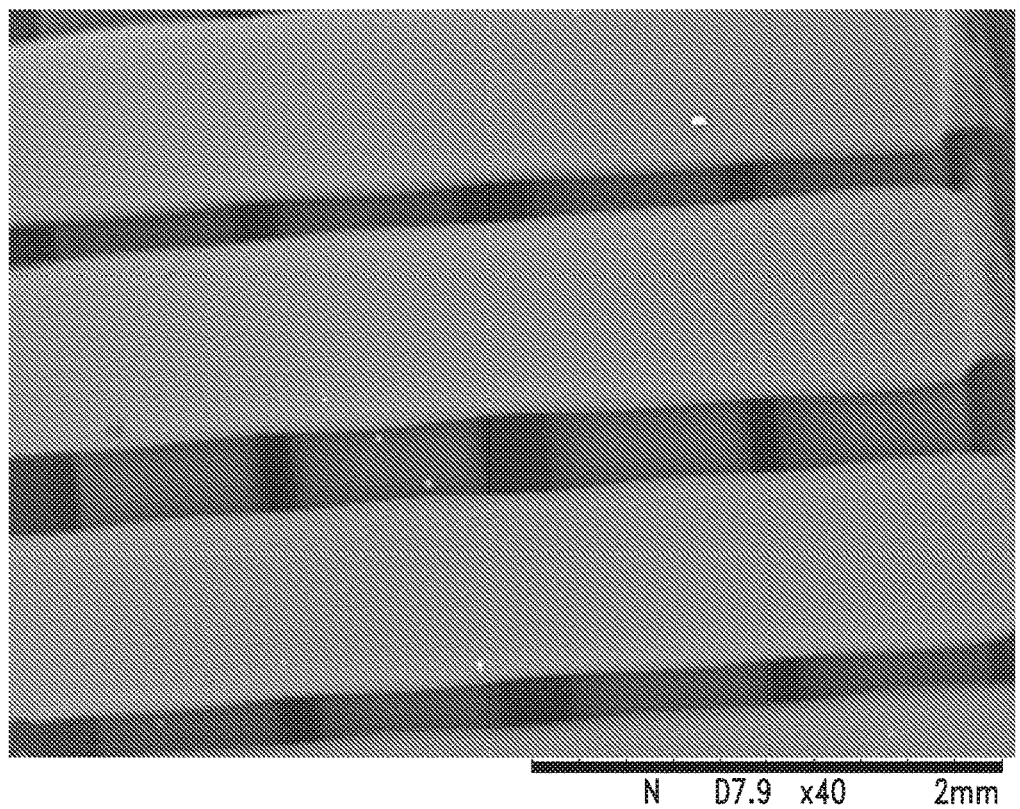
FIG. 2 provides an SEM image of a printed article.

In the printed part, each thread had a width of about 0.8 mm. Thus, this FDM printing process provided a disc with two layers, each layer having a 0.5 mm layer thickness. Each layer, and the disc as a whole, had a rectilinear infill pattern of 80%. The disc had a diameter of 50 mm. An SEM image of the printed article is shown in FIG. 2.

Weighed amounts of the printing filaments having the compositions described in Table 1, and the printed discs made therefrom, were soaked in deionized water at 37° C. for 15 hours, then carefully removed from the water bath, dried to constant weight, and then re-weighed to determine extracted content. Samples were imaged with Scanning Electron Microscopy (SEM) to evaluate morphology, and images were further characterized with ImageJ (National Institutes of Health).

Table 2 lists the extracted content (in weight percent based on the original weight of the sample) and the extraction efficiency (the % of soluble polymer (PEG) present in the original format that was extracted) for each of the materials and formats tested.

TABLE 2

| Material | Format | Extracted Content wt % | Extraction Efficiency % | Feature Alignment Standard Deviation from Mean, ° |
|---|---|---|---|---|
| PDO 100 | Printed Part | 1.2% | — | 75.9 |
| PDO 60 | Filament | 31% | 78% | 15.4 |
| PDO 60 | Printed Part | 40% | 100% | 15.8 |
| PDO 50 | Filament | 44% | 88% | 13.1 |
| PDO 50 | Printed Part | 46% | 92% | 14.1 |

Table 2 shows that a part printed with PDO 100 printing filament lost 1.2% of its weight after the soaking process. This serves as a control. When printing filament containing 60 wt % PDO and 40 wt % PEG was used to print a part, the starting filament lost 78% of the weight of its PEG component during the soaking process, while the part printed from this printing filament lost 100% of the weight of its PEG component during the soaking process. When a printing filament containing 50 wt % PDO and 50 wt % PEG was used to print a part, the starting filament lost 88% of the weight of its PEG component during the soaking process, while the part printed from this printing filament lost 92% of the weight of its PEG component during the soaking process.

Figure 3A:
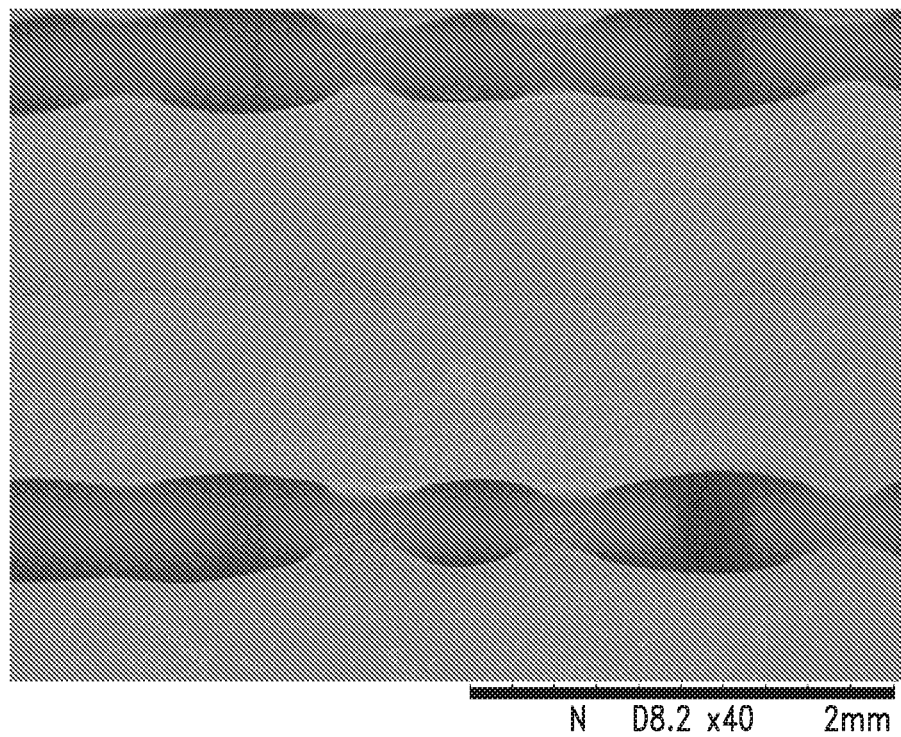
FIGS. 3A and 3B provide SEM images of a printed article before (FIG. 3A) and after (FIG. 3B) solvent extraction.
Figure 3B:
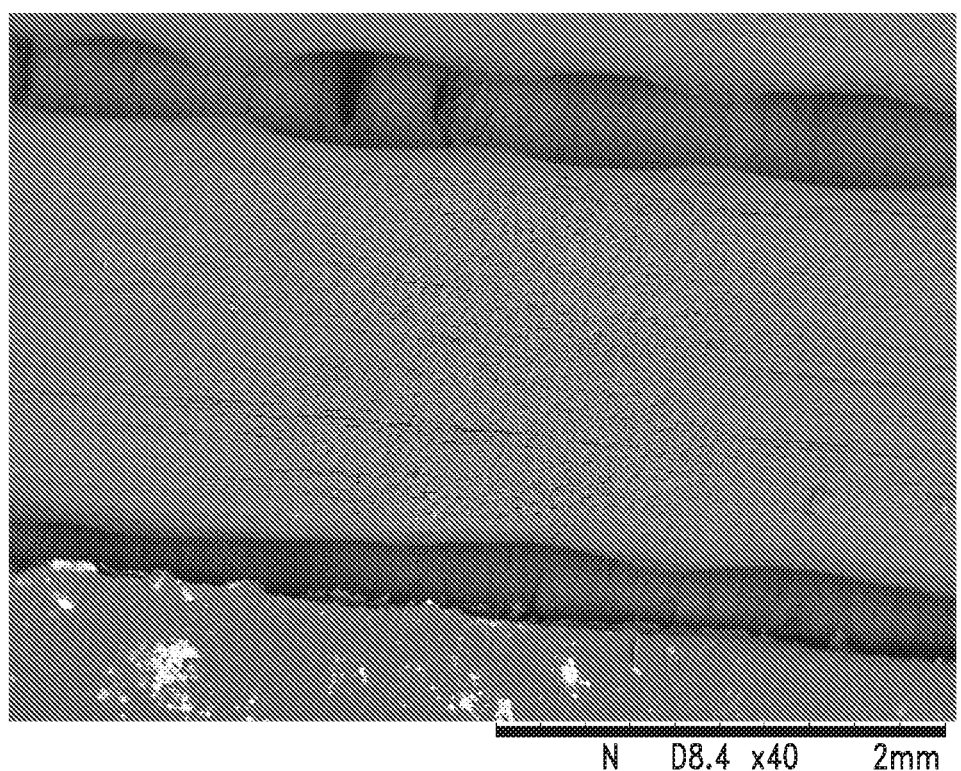
Figure 4A:
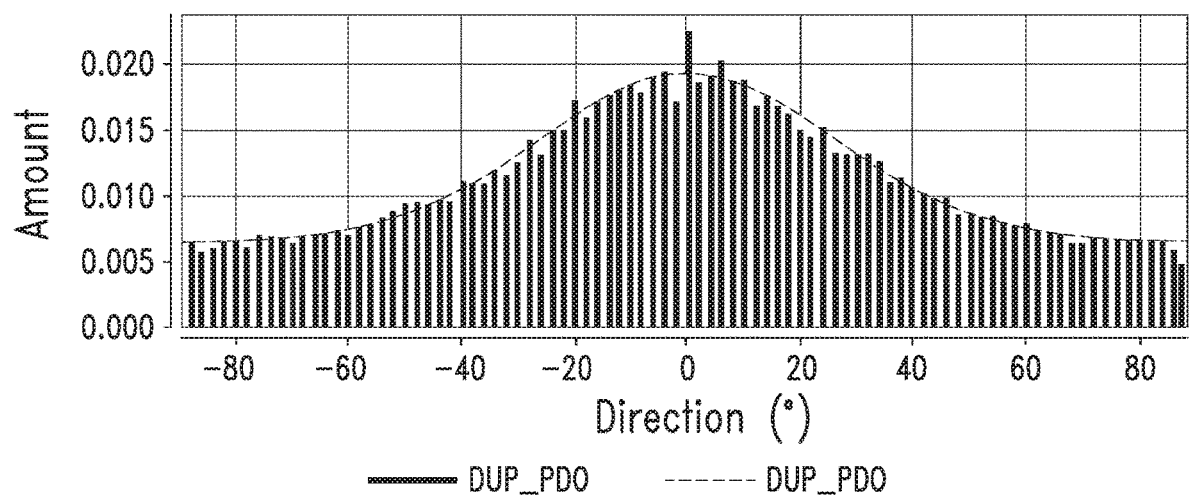
FIGS. 4A and 4B show histograms of pore directionality for printed articles before (FIG. 4A) and after (FIG. 4B) solvent extraction.
Figure 4B:
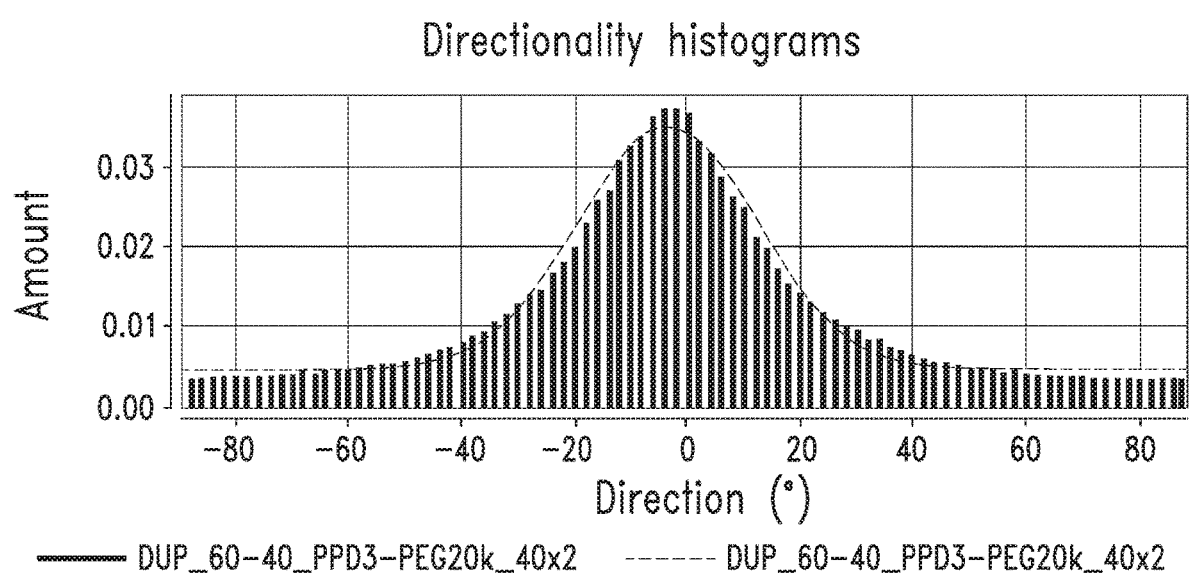

FIG. 3A provides an SEM image of a part printed with PDO 60 printing filament. The part shown in FIG. 3A has not undergone an extraction process. FIG. 3B provides an SEM image of a part printed with PEO 60 printing filament, but in contrast to the part shown in FIG. 3A, the part shown in FIG. 3B has been exposed to an extraction solvent. As shown in FIG. 3B, dissolution of the PEG from the printed threads left behind a series of channels that each run along the longitudinal axis of the printed thread. These channels are not seen in the part shown in FIG. 3A. This directionality is quantified using the ImageJ software from NIH, which provided the histograms in FIG. 4A (corresponding to the part in FIG. 3A) and in FIG. 4B (corresponding to the part in FIG. 3B). A similar result was seen from soaking of the PDO 50-derived parts. The parts shown in FIGS. 3A and 3B appear to have wider threads than the threads shown in the image of FIG. 2, and the reason is that in FIGS. 3A and 3B the printed threads are seen to be right next to one another, without any gap between the threads, thus giving the appearance of a wider thread when in fact there are two threads in what appears to be one thread.

FDM printed parts, post water-extraction, exhibited primarily as continuous and aligned filaments. In both the PDO 50 and PDO 60 materials, filament alignment was in the direction of nozzle path, i.e. along the print axis. The printed parts extracted with high efficiency, meaning that there was very little or no residual soluble PEG left in the printed part after extraction, and extraction was improved compared to the extractability of PEG from the filament precursor.

Example 2

Microfibrous Article Made from High Density Polyethylene and Polycaprolactone

Filaments were prepared as described in Example 1, using high density polyethylene (HDPE) and polycaprolactone (PCL) as the insoluble and soluble materials, respectively. HDPE (Dow Chemical) and PCL (Poly-Med, Anderson, S.C. USA), the latter having an inherent viscosity (IV)=1.8 g/mL in $CHCl_3$ were both used without modification. 1.75 mm diameter printing filament was collected with composition ratios as described in Table 3. The printing filaments were stored in a dry, inert environment until time of use.

TABLE 3

| HDPE (wt %) | PCL (wt %) | Filament Name |
|---|---|---|
| 100 | 0 | HDPE 100 |
| 60 | 40 | HDPE 60 |
| 45 | 55 | HDPE 45 |
| 20 | 80 | HDPE 20 |
| 0 | 100 | PCL 100 |

FDM printing was performed using a HYDRA 640 printer (Hyrel 3D, Atlanta, Ga.) with a modular direct drive print head equipped with either a 0.4 mm or 1.0 mm nozzle. The effect of nozzle temperature was evaluated at 185° C., 205° C. and 225° C. Each printing filament was printed into the shape of a disc designed with 50% layer thickness to nozzle diameter ratio. In other words, each layer was printed to have a thickness equal to ½ the size of the nozzle diameter (the 0.4 mm nozzle made a 0.2 mm thick layer). Each part had a rectilinear infill pattern set at 80%.

Printed discs, along with printing filament, were soaked in chloroform overnight at room temperature, then carefully removed from the solvent, rinsed in chloroform, and dried to constant weight to determine extracted content. HDPE is insoluble in chloroform and PCL is soluble in chloroform. Samples were imaged with Scanning Electron Microscopy (SEM) to characterize part morphology, and images were characterized with ImageJ (National Institutes of Health).

Extraction details and images are provided in Table 4 and FIGS. 5A, 5B, 5C and 5D. In Table 4, N.D. means not determined.

TABLE 4

| Material | Format | Extracted Content Wt % | Extraction Efficiency % | Feature Alignment Standard Deviation from Mean, ° |
|---|---|---|---|---|
| HDPE 100 | Printed Part | 0 | N/A | N.D. |
| HDPE 60 | Filament | 40 | 100 | 14.0 |
| HDPE 60 | Printed Part | 40 | 100 | 17.7 |
| HDPE 45 | Filament | 51 | 93 | 22.0 |
| HDPE 45 | Printed Part | 52-54 | 95-98 | 9.9 |
| HDPE 20 | Filament | N.D. | N.D. | N.D. |
| HDPE 20 | Printed Part | N.D. | N.D. | N.D. |

The raw material filament (post-extraction) exhibited a combination of fiber-like structure and discontinuous segments with little orientation. 3D Printed parts from HDPE 45 (55% extractable content), post chloroform-extraction, exhibited varying morphology depending on the printing parameters.

Figure 5A:
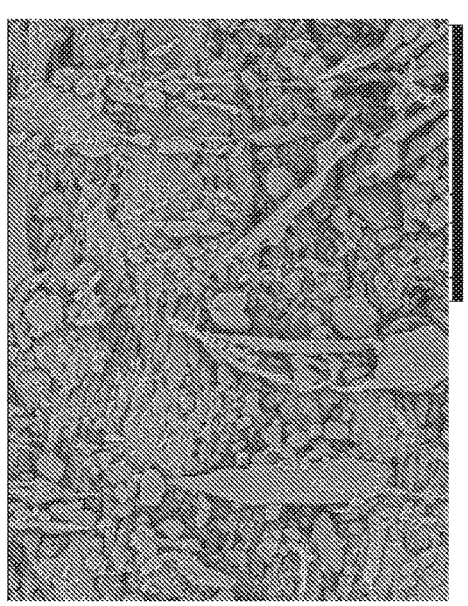
FIGS. 5A, 5B, 5C and 5D provide SEM images of printed articles after solvent extraction.
Figure 5B:
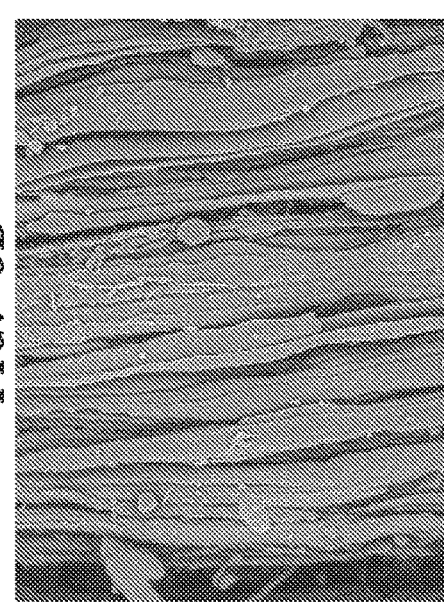

Printing through a 1.0 mm nozzle (FIGS. 5A and 5B) resulted in a similar morphology to the raw material filament, and with increased process temperature (185° C. FIG. 5A; 205° C. FIG. 5B) created finer features.

Figure 5C:
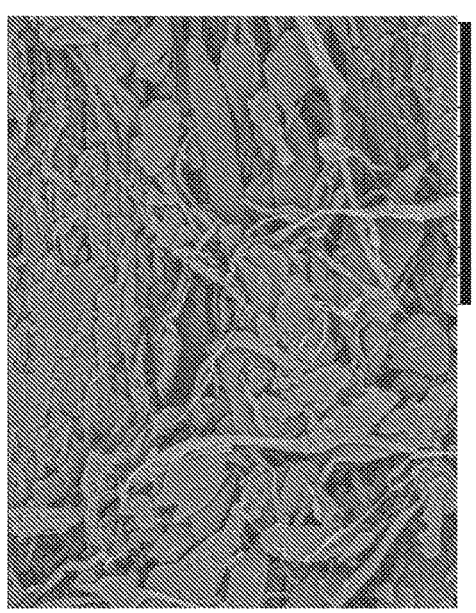
Figure 5D:

Printing through a 0.40 mm nozzle (FIGS. 5C and 5D) surprisingly altered the final morphology into primarily a continuous, aligned filament structure. In this case, a 20° C. process temperature increase (205° C. FIG. 5C; 225° C. FIG. 5D) improved the homogeneity of the filament structure.

In all cases, the extractability of PCL from the 3D printed article was improved compared to the extractability from the raw material printing filament. From this, phase separation and microstructure variants are created through shear (1.8 mm filament extruded through a 1.0 mm or 0.4 mm nozzle) and homogenized with temperature. This is unexpected because the process is conducted at a temperature above the melt temperature for all conditions and one would consider temperature to be the primary driver of phase separation.

Printing filament and the corresponding 3D printed parts made from HDPE 20 were not stable after extraction. The high extractable content resulted in a discontinuous morphology for the insoluble HDPE portion, resulting in the disintegration of the structure into particles of high density polyethylene. Table 4 indicates N.D. (not determined) to reflect this observation.

Example 3

Wicking Articles Made from Microfibrous 3D Printed Articles

Rectangular shapes were isolated from pre-extracted and post-extracted discs prepared in Examples 1 and 2. The rectangular shapes had dimensions of 50 mm length×4 mm width×1 mm thickness. The rectangular shapes were evaluated for water wicking ability by dipping parts into a solution of phenol red indicator dissolved into water and observing the travel of the colored solution through the part. Results are summarized in Table 5 and FIG. 6.

TABLE 5

| Material | Sample Description | Wicking Study Results |
| --- | --- | --- |
| PDO 60 Pre-extraction | Solid parts, no substantial surface features | Very slight surface travel of indicator solution |
| PDO 60 Post-extraction | Continuous, highly aligned microfilament bundles | Wicking through the entirety of the part |
| HDPE 45 Pre-extraction | Solid parts, no substantial surface features | No wicking |
| HDPE 45 Post-extraction | Continuous, highly aligned microfilament bundles | No wicking |

Figure 6:
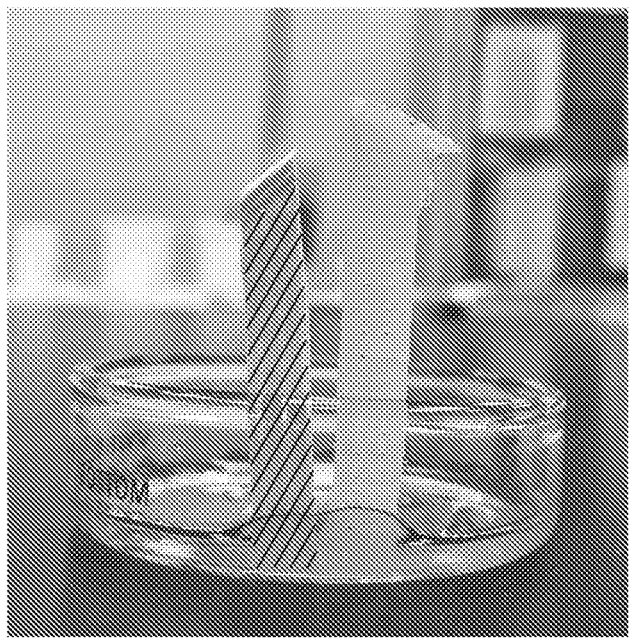
FIG. 6 is a photograph showing the wicking performance of two parts that were each printed with PDO/PEG (60/40).

FIG. 6 shows the difference in aqueous wicking performance between pre-extracted and post-extracted parts printed from PDO 60. Wicking of aqueous phenol red Indicator solution through PDO 60 parts, for pre-extracted part (right) and post-extracted part (left), indicating the wicking response at approximately 1 minute post-dip. Within the 1 minute timeframe, aqueous indicator solution had wicked along the entirety of the post-extracted PDO 60 part (left) while essentially no indicator solution had wicked along the pre-extracted PDO 60 part (right).

Figure 7:
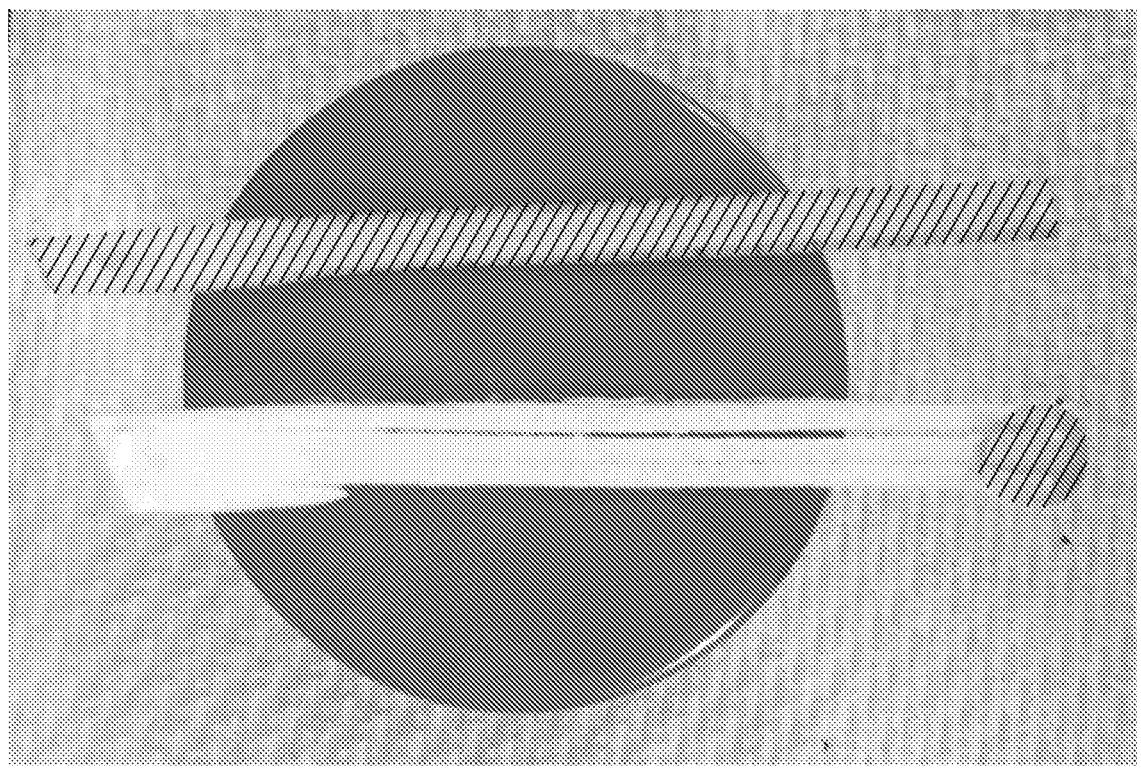
FIG. 7 is a photograph showing the wicking performance of two parts, one printed with PDO/PEG (60/40) and the other printed with HDPE/PCL (45/55).

FIG. 7 shows a comparison of the wicking performance between two different post-extracted printed parts. In FIG. 7, there is shown a comparison of the wicking of aqueous phenol red Indicator solution between HDPE 45 (bottom) and PDO 60 (top), 5 minutes after drops applied. Within the 5 minute timeframe, no wicking of the indicator solution occurred with the HDPE 45 printed part (bottom), however the indicator solution had wicked through the entire length of the PDO 60 printed part (top).

The wicking behavior of 3D printed parts is influenced by the surface energy, and therefore solution compatibility, of the part. The wicking behavior is greatly enhanced by the microstructure created as a result of the blending, printing and extraction process as disclosed herein. The formation of aligned microfilament structure provides greater wicking benefit than a part lacking the aligned microfilament feature.

Example 4

Blended Composition with GLYCOPRENE and LACTOPRENE Polymers

Filaments were prepared as described in Example 1, using a GLYCOPRENE™ 6829 polymer (a glycolide-based copolymer containing 68% glycolide, 29% caprolactone, and 3% trimethylene carbonate, Poly-Med, Anderson S.C., USA) and LACTOPRENE™ 8411 (a lactide-based copolymer containing 84% 1-lactide, 11% caprolactone, and 5% trimethylene carbonate, Poly-Med, Anderson S.C. USA). GLYCOPRENE™ 6829 polymer is a relatively fast degrading polymer in vivo while LACTOPRENE™ 8411 is a relatively slow degrading polymer in vivo. The monofilaments had the compositions shown in Table 6, and each had a 1.75 mm diameter. After formation, the filaments were stored in a dry, inert environment until time of use.

TABLE 6

| Filament Name | LACTOPRENE 8411 (wt %) | GLYCOPRENE 6829 (wt %) |
| --- | --- | --- |
| Lac 100 | 100 | 0 |
| Lac 75 | 75 | 25 |
| Lac 60 | 60 | 40 |
| Lac 50 | 50 | 50 |
| Lac 0 | 0 | 100 |

FDM printing was performed using a F360 printer (Fusion3, Greensboro, N.C.) with a Bowden tube print head equipped with a 0.40 mm nozzle. Each filamentary material was printed into a 50 mm×1 mm disc as described in Example 1, designed with 50% layer thickness to nozzle diameter ratio and a rectilinear infill pattern set at 80%.

To study the degradation profile and in vitro morphology changes, an accelerated degradation study was performed by placing printed discs into a pH 12 phosphate buffer at 50° C. This accelerated model significantly speeds the degradation process of bioabsorbable polymers, thereby reducing the evaluation time from months to days.

Table 7 details the overall part structure retention compared to the "as printed" disc shape. In Table 7, R means good "as printed" shape retention, i.e., the printed shape did not change very much if at all during the degradation study, D means signs of parts losing "as printed" structure, and NR means the part lost its printed structure, where NR1 means filament non-adhesion occurred and NR2 means brittle fracture occurred.

TABLE 7

| | Time (days) of incubation at 12 pH, 50° C. | | | | |
| --- | --- | --- | --- | --- | --- |
| Material | 0 | 0.25 | 1 | 3 | 6 |
| Lac 100 | R | R | R | R | R |
| Lac 75 | R | R | NR1 | NR1 | NR1 |
| Lac 60 | R | R | D | D | D |
| Lac 50 | R | R | R | R | R |
| Lac 0 | R | R | R | R | NR2 |

Figure 8:
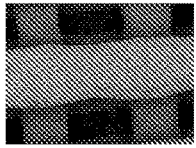
FIG. 8 provides SEM images of 3D printed parts that have been exposed to degradation conditions.
Figure 8:
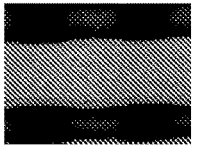
Figure 8:
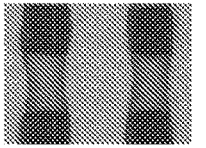
Figure 8:
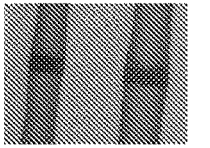
Figure 8:
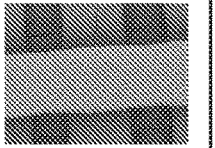
Figure 8:
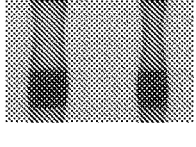
Figure 8:
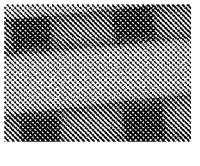
Figure 8:
Figure 8:
Figure 8:
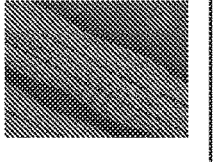
Figure 8:
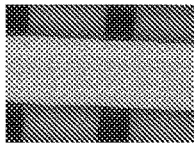
Figure 8:
Figure 8:
Figure 8:
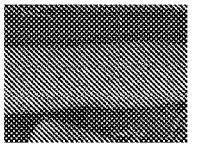
Figure 8:
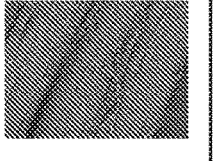
Figure 8:
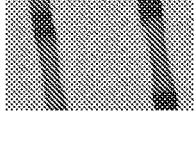
Figure 8:
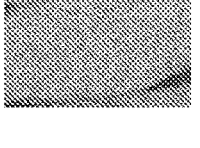
Figure 8:
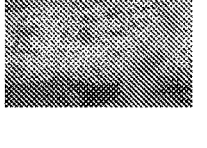
Figure 8:
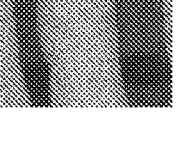
Figure 8:
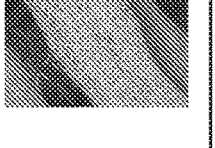
Figure 8:
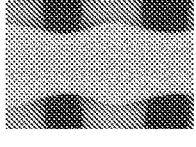
Figure 8:
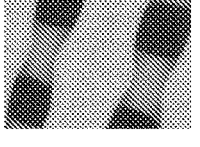
Figure 8:
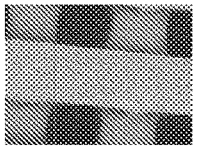
Figure 8:
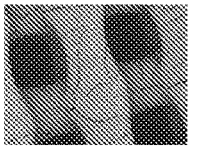
Figure 8:
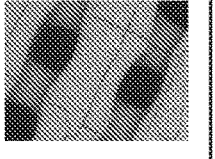
Figure 9:
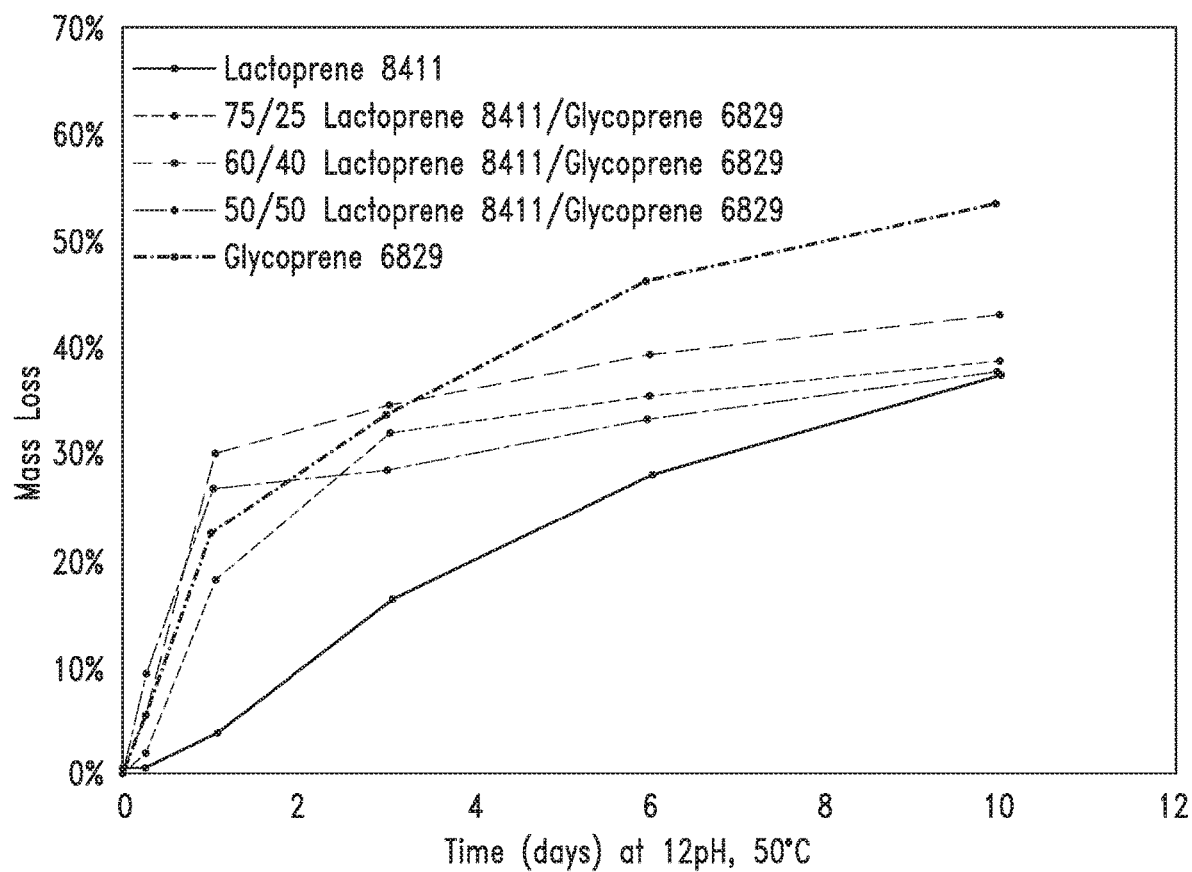
FIG. 9 is a graph of estimated accelerated time in vitro (days) vs. amount of degradation, for 3D printed parts having various compositions.

Samples were analyzed for morphology with SEM and composition by NMR before and during the in vitro study to understand performance differences between the various blends being studied. Degradation images and mass loss details are shown in FIGS. 8 and 9. In FIG. 8, SEM images are shown at 150× magnification. In FIG. 8, A refers to parts made from Lac 100, B refers to parts made from Lac 75, C refers to parts made from Lac 60, D refers to parts made from Lac 50, and E refers to parts made from Lac 0, using the nomenclature adopted in Table 7. FIG. 9 is a graph showing the mass loss profiles of 3D printed parts through a 12 pH, 50° C. in vitro degradation cycle. The percentage value is the percent of the total.

3D printed parts from LACTOPRENE 8411 blends exhibited markedly different degradation morphology compared to single component filament. The composition of the blended materials alters the phase separation within the 3D printed part. A 50/50 blend with GLYCOPRENE 6829 yields a mixed morphology containing some aligned fibers and shorter segments. A 60/40 blend yields an aligned filamentous structure upon partial degradation. A 75/25 blend yields a first ribbon-like structure upon partial degradation followed by a filamentous structure with further degradation.

Each blend exhibited a different capability in printed shape retention through the degradation cycle, with lower percentages of LACTOPRENE 8411 unexpectedly retaining a higher level of "as printed" part shape. Higher ratios of LACTOPRENE in the blend resulted in filament non-adhesion during in vitro degradation, evidenced by the structure "unravelling." All blended parts changed in physical morphology throughout degradation while parts made of only GLYCOPRENE 6829 or LACTOPRENE 8411 exhibited surface cracking and embrittlement during the in vitro evaluation period.

Example 5

Porous Articles by 3D Printing of Polycaprolactone with Distributed Inorganic Salt Filaments were prepared as described in Example 1, by blending together polycaprolactone (PCL) homopolymer and NaCl (Sigma Aldrich), with the former being insoluble in water and the latter having solubility of 1 M in water at 20° C. The materials were blended in an extruder to form monofilaments having a 1.75 mm diameter, with material ratios as described in Table 8, and then stored in a dry, inert environment until time of use.

TABLE 8

| Filament Name | % PCL | % NaCl |
| --- | --- | --- |
| PCL 100 | 100 | 0 |
| PCL 80 | 80 | 20 |
| PCL 70 | 70 | 30 |
| PCL 60 | 60 | 40 |

FDM printing was performed on a HYDRA™ 640 printer (Hyrel 3D, Atlanta, Ga.) into 50 mm diameter discs using a 1.0 mm nozzle at 165° C., with disc thickness of 0.5 mm and a rectilinear infill at 80%. Filament, as well as 3D printed articles, were soaked in deionized water for 15 hours at room temperature and then dried to constant weight to determine extractable content. The articles were imaged by SEM to identify article morphology, with results provided in Table 9. Table 9 shows the biocomponent material initial composition and subsequent extraction trial results.

TABLE 9

| Filament | Format | Extractable Content | Extraction Efficiency |
| --- | --- | --- | --- |
| PCL 100 | 3D Printed Part | 0.4% | N.A. |
| PCL 80 | Filament | 7.9% | 40% |
| PCL 80 | 3D Printed Part | 9.2% | 46% |
| PCL 70 | Filament | 11.6% | 39% |
| PCL 70 | 3D Printed Part | 24.5% | 82% |
| PCL 60 | Filament | 13.1% | 33% |
| PCL 60 | 3D Printed Part | 26.4% | 66% |

Water extractions yielded a partial although not complete removal of loaded salt. Noteworthy is that significantly increased extraction efficiency was observed from the 3D printed parts as compared to the starting material filament. By SEM analysis, the pores created by salt elution appeared to be disconnected. The appearance of the created pores is consistent with the size and shape of the loaded salt particulate. A higher loading of salt (e.g., 50 wt % or more) would be expected to create an open-cell porous structure.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended, and those skilled in the art will recognize, that the invention embraces and is also thereby described in terms of any individual member and any subgroup of members of the Markush group, and Applicants reserve the right to revise the application or claims to refer specifically to any individual member or any subgroup of members of the Markush group.

All references disclosed herein, including patent references and non-patent references, are hereby incorporated by reference in their entirety as if each was incorporated individually.

It is to be understood that the terminology used herein is for the purpose of describing specific embodiments only and is not intended to be limiting. It is further to be understood that unless specifically defined herein, the terminology used herein is to be given its traditional meaning as known in the relevant art.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents, i.e., one or more, unless the content and context clearly dictates otherwise. It should also be noted that the conjunctive terms, "and" and "or" are generally employed in the broadest sense to include "and/or" unless the content and context clearly dictates inclusivity or exclusivity as the case may be. Thus, the use of the alternative (e.g., "or") should be understood to mean either one, both, or any combination thereof of the alternatives. In addition, the composition of "and" and "or" when recited herein as "and/or" is intended to encompass an embodiment that includes all of the associated items or ideas and one or more other alternative embodiments that include fewer than all of the associated items or ideas.

Unless the context requires otherwise, throughout the specification and claims that follow, the word "comprise" and synonyms and variants thereof such as "have" and "include", as well as variations thereof such as "comprises" and "comprising" are to be construed in an open, inclusive sense, e.g., "including, but not limited to." The term "consisting essentially of" limits the scope of a claim to the specified materials or steps, or to those that do not materially affect the basic and novel characteristics of the claimed invention.

Any headings used within this document are only being utilized to expedite its review by the reader, and should not be construed as limiting the invention or claims in any manner. Thus, the headings and Abstract of the Disclosure provided herein are for convenience only and do not interpret the scope or meaning of the embodiments.

Where a range of values is provided herein, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

For example, any concentration range, percentage range, ratio range, or integer range provided herein is to be understood to include the value of any integer within the recited range and, when appropriate, fractions thereof (such as one tenth and one hundredth of an integer), unless otherwise indicated. Also, any number range recited herein relating to any physical feature, such as polymer subunits, size or thickness, are to be understood to include any integer within the recited range, unless otherwise indicated. As used herein, the term "about" means±20% of the indicated range, value, or structure, unless otherwise indicated.

All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Such documents may be incorporated by reference for the purpose of describing and disclosing, for example, materials and methodologies described in the publications, which might be used in connection with the presently described invention. The publications discussed herein and throughout the text are provided solely for their disclosure prior to the filing date of the present application. Nothing herein is to be construed as an admission that the inventors are not entitled to antedate any referenced publication by virtue of prior invention.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Applicants reserve the right to physically incorporate into this specification any and all materials and information from any such patents, publications, scientific articles, web sites, electronically available information, and other referenced materials or documents.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Furthermore, the written description portion of this patent includes all claims. Furthermore, all claims, including all original claims as well as all claims from any and all priority documents, are hereby incorporated by reference in their entirety into the written description portion of the specification, and Applicants reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

Other nonlimiting embodiments are within the following claims. The patent may not be interpreted to be limited to the specific examples or nonlimiting embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

What is claimed is:

1. A composition comprising an additive in a polymer phase, wherein:
   a) the additive is soluble in a solvent;
   b) the polymer phase comprises an organic polymer and is essentially insoluble in the solvent;
   c) the composition is a solid at temperatures below 25° C. and a viscous fluid with a Melt Flow Index of 2.5-30 g/10 min at a temperature above 50° C.;
   d) the composition has a weight percent of the additive based on the weight of the composition and a weight percent of the polymer phase based on the weight of the composition, where the sum of the weight percent of the additive and the weight percent of the polymer phase is greater than 90%; and
   e) the composition is in a form of a monofilament.

2. The composition of claim 1 wherein the monofilament is an undrawn monofilament.

3. The composition of claim 1 wherein the monofilament has an orientation factor of less than 50%.

4. The composition of claim 1 wherein the monofilament has a diameter of 1-5 mm.

5. The composition of claim 1 wherein the additive comprises an inorganic salt.

6. The composition of claim 1 wherein the additive comprises a water-soluble organic compound.

7. The composition of claim 6 wherein the water-soluble organic compound is polyetheleneglycol.

8. The composition of claim 1 wherein the polymer phase comprises a bioabsorbable polymer.

9. The composition of claim 8 wherein the bioabsorbable polymer comprising segments selected from polyester, polyanhydride, poly(hydroxybutyrate) and polyether.

10. The composition of claim 1 wherein the polymer phase comprises a non-bioabsorbable polymer.

11. The composition of claim 10 wherein the non-bioabsorbable polymer is selected from polyethylene, nylon, thermoplastic polyurethane, polypropylene, polyetheretherketone, polyaryletherketone and polyethylene terephthalate.

12. The composition of claim 1 wherein the weight percent of the additive in the composition is 1-60%.

13. The composition of claim 1 where the solvent is water, the additive is soluble in water and the polymer phase is insoluble in water.

14. The composition of claim 1 wherein the monofilament has a diameter of 1.75±0.05 mm.

15. The composition of claim 1 wherein the monofilament has a column buckling resistance of at least 1 Newton.

16. A method of forming a composition in a form of a monofilament, the composition comprising an additive in a polymer phase, wherein the additive is soluble in a solvent, the polymer phase comprises an organic polymer and is essentially insoluble in the solvent, the composition is a solid at temperatures below 25° C. and a viscous fluid with a Melt Flow Index of 2.5-30 g/10 min at a temperature above 50° C., the composition has a weight percent of the additive based on the weight of the composition and a weight percent of the polymer phase based on the weight of the composition, where the sum of the weight percent of the additive and the weight percent of the polymer phase is greater than 90%, the method comprising:
   a) combining the additive and the polymer phase to form the composition;
   b) heating the composition to form a molten composition;
   c) extruding the molten composition to form an undrawn monofilament; and
   d) sterilizing the undrawn monofilament.

17. The method of claim 16 wherein the monofilament has an orientation factor of less than 50%.

18. The method of claim 16 wherein the monofilament has a diameter of 1-5 mm.

19. The method of claim 16 wherein the monofilament has a diameter of 1.75±0.05 mm.

20. The method of claim 16 wherein the monofilament has a column buckling resistance of at least 1 Newton.

21. The method of claim 16 wherein the additive comprises an inorganic salt.

22. The method of claim 16 wherein the additive comprises a water-soluble organic compound.

23. The method of claim 22 wherein the water-soluble organic compound is polytheleneglycol.

24. The method of claim 16 wherein the polymer phase comprises a bioabsorbable polymer.

25. The method of claim 24 wherein the bioabsorbable polymer comprising segments selected from polyester, polyanhydride, poly(hydroxybutyrate) and polyether.

26. The method of claim 16 wherein the polymer phase comprises a non-bioabsorbable polymer.

27. The method of claim 26 wherein the non-bioabsorbable polymer is selected from polyethylene, nylon, thermoplastic polyurethane, polypropylene, polyetheretherketone, polyaryletherketone and polyethylene terephthalate.

28. The method of claim 16 wherein the weight percent of the additive in the composition is 1-60%.

29. The method of claim 16 wherein the solvent is water, the additive is soluble in water and the polymer phase is insoluble in water.

30. A method of forming an assembly comprising:
   a) providing a composition in a molten form, the composition comprising an additive in a polymer phase, wherein the additive is soluble in a solvent, the polymer phase comprises an organic polymer and is essentially insoluble in the solvent, the composition is a solid at temperatures below 25° C. and a viscous fluid with a Melt Flow Index of 2.5-30 g/10 min at a temperature above 50° C., the composition has a weight percent of the additive based on the weight of the composition and a weight percent of the polymer phase based on the weight of the composition, where the sum of the weight percent of the additive and the weight percent of the polymer phase is greater than 90%;
   b) extruding the molten form of the composition to form an undrawn monofilament;
   c) winding the undrawn monofilament onto a spool; and
   d) packaging the spool with monofilament wound thereon.

31. The method of claim 30 wherein the spool with monofilament wound thereon is packaged in an air-tight container.

32. The method of claim 30 wherein the monofilament has an orientation factor of less than 50%.

33. The method of claim 30 wherein the monofilament has a diameter of 1-5 mm.

34. The method of claim 30 wherein the monofilament has a diameter of 1.75±0.05 mm.

35. The method of claim 30 wherein the monofilament has a column buckling resistance of at least 1 Newton.

36. The method of claim 30 wherein the additive comprises an inorganic salt.

37. The method of claim 30 wherein the additive comprises a water-soluble organic compound.

38. The method of claim 37 wherein the water-soluble organic compound is polytheleneglycol.

39. The method of claim 30 wherein the polymer phase comprises a bioabsorbable polymer.

40. The method of claim 39 wherein the bioabsorbable polymer comprising segments selected from polyester, polyanhydride, poly(hydroxybutyrate) and polyether.

41. The method of claim 30 wherein the polymer phase comprises a non-bioabsorbable polymer.

42. The method of claim 41 wherein the non-bioabsorbable polymer is selected from polyethylene, nylon, thermoplastic polyurethane, polypropylene, polyetheretherketone, polyaryletherketone and polyethylene terephthalate.

43. The method of claim 30 wherein the weight percent of the additive in the composition is 1-60%.

44. The method of claim 30 wherein the solvent is water, the additive is soluble in water and the polymer phase is insoluble in water.

45. A method of additive manufacturing, the method comprising:
   a) melting a solid composition to provide a molten composition, the molten composition comprising an additive and a polymer phase, wherein the additive is soluble in a solvent, the polymer phase comprises an organic polymer and is essentially insoluble in the solvent, the composition is a solid at temperatures below 25° C. and a viscous fluid with a Melt Flow Index of 2.5-30 g/10 min at a temperature above 50° C., the composition has a weight percent of the additive based on the weight of the composition and a weight percent of the polymer phase based on the weight of the composition, where the sum of the weight percent of the additive and the weight percent of the polymer phase is greater than 90%;
   b) performing additive manufacturing to form an article from the molten composition; and
   c) contacting the article with a solvent, where the additive is soluble in the solvent, under conditions which at least partially dissolves the additive but not the polymer phase, to form a porous form of the article.

46. The method of claim 45 wherein the solvent dissolves at least 50% of the additive.

47. The method of claim 45 wherein the solid composition is melted at a temperature of 50-450° C. to form the molten composition.

48. The method of claim 45 wherein the additive manufacturing method is fused filament fabrication (FFF).

49. The method of claim 45 wherein the porous form of the article comprises a plurality of channels that run along the surface of the article in a longitudinal direction compared to the longitudinal direction of a fibrous form of the molten composition created during the additive manufacturing process.

50. The method of claim 45 further comprising sterilizing the article by a method selected from treatment with ethylene oxide, gamma, e-beam, dry heat and steam processes.

51. The method of claim 45 further comprising removing solvent from the article such that any residual solvent is less than one weight percent based on the weight of the porous form of the article.

52. The method of claim 45 wherein the monofilament has an orientation factor of less than 50%.

53. The method of claim 45 wherein the monofilament has a diameter of 1-5 mm.

54. The method of claim 45 wherein the monofilament has a diameter of 1.75±0.05 mm.

55. The method of claim 45 wherein the monofilament has a column buckling resistance of at least 1 Newton.

56. The method of claim 45 wherein the additive comprises an inorganic salt.

57. The method of claim 45 wherein the additive comprises a water-soluble organic compound.

58. The method of claim 57 wherein the water-soluble organic compound is polytheleneglycol.

59. The method of claim 45 wherein the polymer phase comprises a bioabsorbable polymer.

60. The method of claim 59 wherein the bioabsorbable polymer comprising segments selected from polyester, polyanhydride, poly(hydroxybutyrate) and polyether.

61. The method of claim 45 wherein the polymer phase comprises a non-bioabsorbable polymer.

62. The method of claim 61 wherein the non-bioabsorbable polymer is selected from polyethylene, nylon, thermoplastic polyurethane, polypropylene, polyetheretherketone, polyaryletherketone and polyethylene terephthalate.

63. The method of claim 45 wherein the weight percent of the additive in the composition is 1-60%.

64. The method of claim 45 wherein the solvent is water, the additive is soluble in water and the polymer phase is insoluble in water.

65. A method of additive manufacturing, the method comprising:
a) providing a composition comprising an additive in a polymer phase, wherein the additive is soluble in a solvent, the polymer phase comprises an organic polymer and is essentially insoluble in the solvent, the composition is a solid at temperatures below 25° C. and a viscous fluid with a Melt Flow Index of 2.5-30 g/10 min at a temperature above 50° C., the composition has a weight percent of the additive based on the weight of the composition and a weight percent of the polymer phase based on the weight of the composition, where the sum of the weight percent of the additive and the weight percent of the polymer phase is greater than 90%;
b) extruding the composition into a monofilament fiber;
c) melting the monofilament fiber to provide a molten composition;
d) performing additive manufacturing to form an article from the molten composition;
e) contacting the article with a solvent, where the additive is soluble in the solvent, under conditions which at least partially dissolves the additive but not the polymer phase, to form a porous form of the article; and
removing solvent from the porous form of the article such that any residual solvent is less than one weight percent based on the weight of the porous form of the article.

66. The method of claim 65 wherein the monofilament has an orientation factor of less than 50%.

67. The method of claim 65 wherein the monofilament has a diameter of 1-5 mm.

68. The method of claim 65 wherein the monofilament has a diameter of 1.75±0.05 mm.

69. The method of claim 65 wherein the monofilament has a column buckling resistance of at least 1 Newton.

70. The method of claim 65 wherein the additive comprises an inorganic salt.

71. The method of claim 65 wherein the additive comprises a water-soluble organic compound.

72. The method of claim 71 wherein the water-soluble organic compound is polytheleneglycol.

73. The method of claim 65 wherein the polymer phase comprises a bioabsorbable polymer.

74. The method of claim 73 wherein the bioabsorbable polymer comprising segments selected from polyester, polyanhydride, poly(hydroxybutyrate) and polyether.

75. The method of claim 65 wherein the polymer phase comprises a non-bioabsorbable polymer.

76. The method of claim 75 wherein the non-bioabsorbable polymer is selected from polyethylene, nylon, thermoplastic polyurethane, polypropylene, polyetheretherketone, polyaryletherketone and polyethylene terephthalate.

77. The method of claim 65 wherein the weight percent of the additive in the composition is 1-60%.

78. The method of claim 65 wherein the solvent is water, the additive is soluble in water and the polymer phase is insoluble in water.

\* \* \* \* \*